United States Patent
Rico Alvarino et al.

(10) Patent No.: US 10,848,294 B2
(45) Date of Patent: Nov. 24, 2020

(54) MANAGEMENT OF REMOTE INTERFERENCE IN TIME DIVISION DUPLEXING NETWORKS

(71) Applicant: QUALCOMM Incorporated, San Diego, CA (US)

(72) Inventors: Alberto Rico Alvarino, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/399,996

(22) Filed: Apr. 30, 2019

(65) Prior Publication Data

US 2019/0342057 A1 Nov. 7, 2019

Related U.S. Application Data

(60) Provisional application No. 62/666,072, filed on May 2, 2018.

(51) Int. Cl.
*H04L 5/00* (2006.01)
*H04W 72/04* (2009.01)
(Continued)

(52) U.S. Cl.
CPC .......... *H04L 5/0073* (2013.01); *H04L 5/0048* (2013.01); *H04L 5/1461* (2013.01);
(Continued)

(58) Field of Classification Search
CPC ....... H04L 5/14; H04L 5/1461; H04L 5/0048; H04L 5/1469; H04L 5/0073;
(Continued)

(56) References Cited

U.S. PATENT DOCUMENTS

2014/0148179 A1* 5/2014 Das ...................... H04B 1/7107
455/452.1
2015/0189666 A1* 7/2015 Wang ................ H04W 72/0406
370/329

(Continued)

FOREIGN PATENT DOCUMENTS

EP 2923510 A1 9/2015

OTHER PUBLICATIONS

International Search Report and Written Opinion—PCT/US2019/030211—ISA/EPO—Jul. 3, 2019.

*Primary Examiner* — Kyaw Z Soe
(74) *Attorney, Agent, or Firm* — Holland & Hart LLP/Qualcomm Inc.; Nerrie M. Zohn

(57) ABSTRACT

Methods, systems, and devices for wireless communications are described. An aggressor base station may cause interference at a remote victim base station. The victim base station may detect the interference and may transmit a remote interference reference signal (RI-RS) to the aggressor base station. The aggressor base station may identify and measure the interference based on the RI-RS, and may send a measurement of the interference to the victim base station. The base stations may then implement a mitigation technique based on the reported interference and other information exchanged via backhaul links. For example, the interference may be mitigated by modifying transmission at the aggressor base station or by modifying uplink scheduling at the victim base station.

31 Claims, 16 Drawing Sheets

(51) Int. Cl.
    *H04W 56/00*     (2009.01)
    *H04L 5/14*     (2006.01)
    *H04W 72/08*     (2009.01)
    *H04W 28/02*     (2009.01)

(52) U.S. Cl.
    CPC ..... *H04W 28/0236* (2013.01); *H04W 56/001* (2013.01); *H04W 72/0446* (2013.01); *H04W 72/0486* (2013.01); *H04W 72/082* (2013.01)

(58) Field of Classification Search
    CPC .... H04L 5/0094; H04W 28/02; H04W 56/00; H04W 72/04; H04W 72/08; H04W 56/001; H04W 72/0446; H04W 28/0236; H04W 72/082; H04W 72/0486; H04W 72/1231; H04W 52/00
    See application file for complete search history.

(56) References Cited

U.S. PATENT DOCUMENTS

| | | | |
|---|---|---|---|
| 2017/0126340 A1* | 5/2017 | Li | H04W 52/241 |
| 2018/0288745 A1* | 10/2018 | Davydov | H04L 5/0048 |
| 2019/0181922 A1* | 6/2019 | Lee | H04W 24/10 |

\* cited by examiner

FIG. 4A
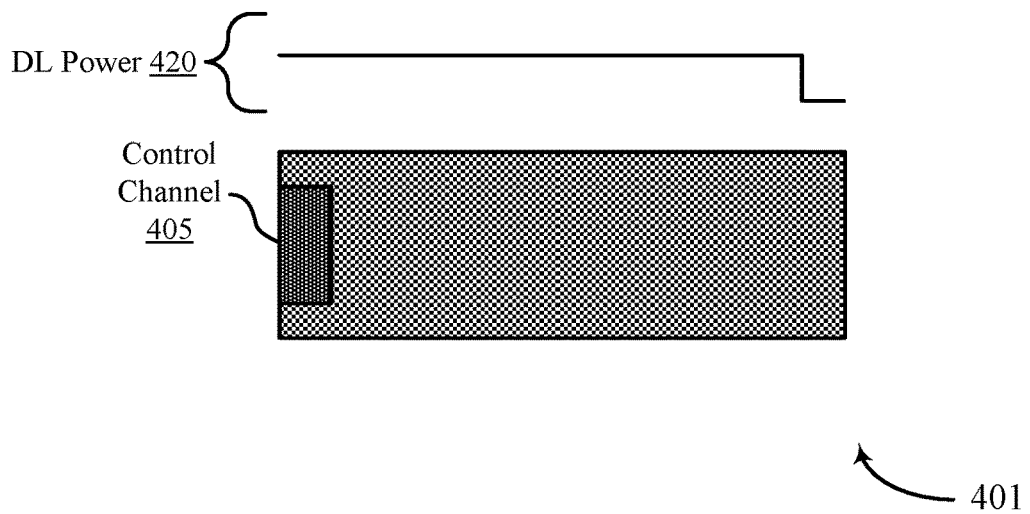
FIG. 4B
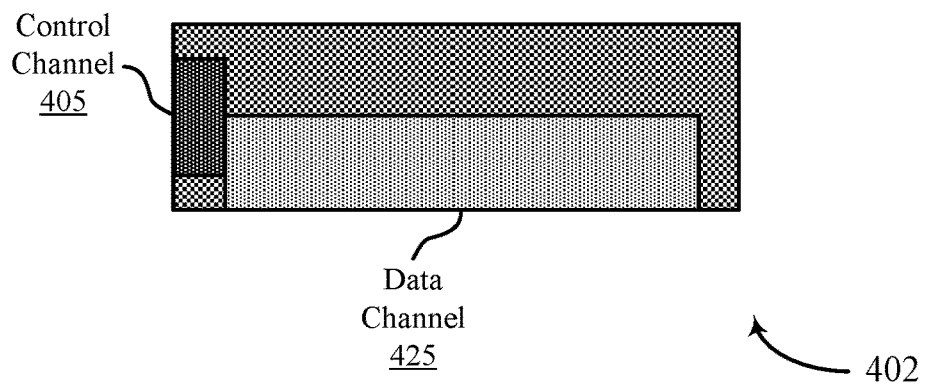
FIG. 4C
 Reference signals 410

Uplink Transmission 505

MANAGEMENT OF REMOTE INTERFERENCE IN TIME DIVISION DUPLEXING NETWORKS

CROSS REFERENCES

The present Application for Patent claims the benefit of U.S. Provisional Patent Application No. 62/666,072 by Rico Alvarino et al., entitled "MANAGEMENT OF REMOTE INTERFERENCE IN TIME DIVISION DUPLEXING NETWORKS," filed May 2, 2018, assigned to the assignee hereof, and expressly incorporated by reference herein in its entirety.

BACKGROUND

The following relates generally to wireless communications, and more specifically to management of remote interference in time division duplexing networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may support multiple base stations operating according to time division duplexing (TDD) configurations. The TDD configurations may have some transmission time intervals (TTIs) configured for downlink transmissions, some TTIs configured for uplink transmissions, and some time periods configured for switching between downlink and uplink transmissions (e.g., special subframes or guard periods). In some cases, the TDD configurations for multiple base stations may be time-aligned. Variable propagation conditions may provide challenges in interference management between the base stations.

SUMMARY

A wireless communications system may support multiple base stations operating according to time-aligned time division duplexing (TDD) configurations. The base stations may simultaneously transmit downlink information in downlink transmission time intervals (TTIs) or slots and receive uplink information in subsequent uplink TTIs or slots. In some cases, transmissions from one of the base stations, referred to as an aggressor base station, may experience variable propagation conditions. When the transmissions have strong propagation conditions in directions of other base stations, the transmissions may reach another base station with a synchronized TDD configuration with sufficient power to cause interference. The base station experiencing the interference may be referred to as a victim base station. Based on the distance between the base stations, the downlink transmission from the aggressor base station may reach the victim base station during an uplink slot or field of the TDD configuration and interfere with uplink transmissions to the victim base station.

The aggressor base station and the victim base station may implement techniques to identify and mitigate interference from the aggressor base station. For example, the aggressor base station or victim base station may transmit a signal, referred to as a remote interference reference signal (RI-RS), that enhances detection of interference caused by the aggressor base station at the victim base station. The aggressor base station or victim base station may transmit the RI-RS at the end of the downlink TTI which is anticipated to overlap with the uplink transmission and result in interference. The victim base station or aggressor base station may identify the aggressor base station or victim base station, respectively, based on the signal and measure the interference caused by the other base station. The victim base station may transmit an indication of the interference to the aggressor base station via backhaul links. The aggressor base station or the victim base station may then implement a mitigation technique based on the interference indication and other information exchanged via backhaul links. For example, the interference may be mitigated by modifying transmission at the aggressor base station or by modifying uplink scheduling at the victim base station.

A method of wireless communication is described. The method may include identifying, at a first base station operating according to a first TDD configuration, an indicator to monitor for an RI-RS scheduled for transmission by a second base station, the second base station operating according to a second TDD configuration that is synchronized in time with the first TDD configuration, monitoring for the RI-RS from the second base station during at least a portion of a first uplink TTI of the first TDD configuration, and reporting measurement information associated with resources of the RI-RS based on the monitoring for the RI-RS.

An apparatus for wireless communication is described. The apparatus may include a processor, memory in electronic communication with the processor, and instructions stored in the memory. The instructions may be executable by the processor to cause the apparatus to identify, at a first base station operating according to a first TDD configuration, an indicator to monitor for an RI-RS scheduled for transmission by a second base station, the second base station operating according to a second TDD configuration that is synchronized in time with the first TDD configuration, monitor for the RI-RS from the second base station during at least a portion of a first uplink TTI of the first TDD configuration, and report measurement information associated with resources of the RI-RS based on the monitoring for the RI-RS.

Another apparatus for wireless communication is described. The apparatus may include means for identifying, at a first base station operating according to a first TDD configuration, an indicator to monitor for an RI-RS scheduled for transmission by a second base station, the second base station operating according to a second TDD configuration that is synchronized in time with the first TDD configuration, monitoring for the RI-RS from the second base station during at least a portion of a first uplink TTI of the first TDD configuration, and reporting measurement information associated with resources of the RI-RS based on the monitoring for the RI-RS.

A non-transitory computer-readable medium storing code for wireless communication is described. The code may include instructions executable by a processor to identify, at a first base station operating according to a first TDD configuration, an indicator to monitor for an RI-scheduled for transmission by a second base station, the second base station operating according to a second TDD configuration that is synchronized in time with the first TDD configuration, monitor for the RI-RS from the second base station during at least a portion of a first uplink TTI of the first TDD configuration, and report measurement information associated with resources of the RI-RS based on the monitoring for the RI-RS.

Some examples of the method, apparatuses, and non-transitory computer-readable medium described herein may further include operations, features, means, or instructions for receiving an indication of the RI-RS, the indication including at least one of: a periodicity of the RI-RS, resources associated with the RI-RS, or a sequence for the RI-RS.

Some examples of the method, apparatuses, and non-transitory computer-readable medium described herein may further include operations, features, means, or instructions for performing an interference mitigation action including at least one of: modifying a reference signal configuration for the first base station, modifying a transmission power for at least one time-frequency resource of a downlink TTI, modifying a number of symbols of a downlink physical shared channel transmission in the downlink TTI, suppressing scheduling for at least one beam for the downlink TTI, or suppressing scheduling for at least one transmission layer for the downlink TTI.

In some examples of the method, apparatuses, and non-transitory computer-readable medium described herein, the first TDD configuration and the second TDD configuration may have a same directional symbol pattern or the first TDD configuration and the second TDD configuration may have different directional symbol patterns.

In some examples of the method, apparatuses, and non-transitory computer-readable medium described herein, the detecting the RI-RS may include operations, features, means, or instructions for identifying a beam identifier associated with the RI-RS.

Some examples of the method, apparatuses, and non-transitory computer-readable medium described herein may further include operations, features, means, or instructions for detecting, by the first base station, interference from the second base station, and sending, to the second base station, a request for transmission of the RI-RS.

A method of wireless communication is described. The method may include identifying, at a first base station, an indicator for transmitting an RI-RS to a second base station, the first base station configured with a first TDD configuration and the second base station configured with a second TDD configuration that is synchronized in time with the first TDD configuration, transmitting the RI-RS based on the indicator, during at least a portion of a downlink TTI, and monitoring for a variation in interference for the first cell based on transmitting the RI-RS.

An apparatus for wireless communication is described. The apparatus may include a processor, memory in electronic communication with the processor, and instructions stored in the memory. The instructions may be executable by the processor to cause the apparatus to identify, at a first base station, an indicator for transmitting an RI-RS to a second base station, the first base station configured with a first TDD configuration and the second base station configured with a second TDD configuration that is synchronized in time with the first TDD configuration, transmit the RI-RS based on the indicator, during at least a portion of a downlink TTI, and monitor for a variation in interference for the first cell based on transmitting the RI-RS.

Another apparatus for wireless communication is described. The apparatus may include means for identifying, at a first base station, an indicator for transmitting an RI-RS to a second base station, the first base station configured with a first TDD configuration and the second base station configured with a second TDD configuration that is synchronized in time with the first TDD configuration, transmitting the RI-RS based on the indicator, during at least a portion of a downlink TTI, and monitoring for a variation in interference for the first cell based on transmitting the RI-RS.

A non-transitory computer-readable medium storing code for wireless communication is described. The code may include instructions executable by a processor to identify, at a first base station, an indicator for transmitting an RI-RS to a second base station, the first base station configured with a first TDD configuration and the second base station configured with a second TDD configuration that is synchronized in time with the first TDD configuration, transmit the RI-RS based on the indicator, during at least a portion of a downlink TTI, and monitor for a variation in interference for the first cell based on transmitting the RI-RS.

Some examples of the method, apparatuses, and non-transitory computer-readable medium described herein may further include operations, features, means, or instructions for receiving measurement information from the second base station based on transmitting the RI-RS.

In some examples of the method, apparatuses, and non-transitory computer-readable medium described herein, the measurement information may include operations, features, means, or instructions for a location of the second base station, an observed delay at the second base station associated with the first cell, detected power information for one or more time-frequency resources, detected signal strength for the RI-RS, or a detected transmission parameter for the RI-RS.

Some examples of the method, apparatuses, and non-transitory computer-readable medium described herein may further include operations, features, means, or instructions for performing an interference cancellation operation on a received uplink transmission in a second uplink TTI to suppress a transmission from the second base station, the interference cancellation operation based on the receiving the measurement information.

Some examples of the method, apparatuses, and non-transitory computer-readable medium described herein may further include operations, features, means, or instructions for performing an interference mitigation action based on a first loading level associated with the first base station and a second loading level associated with the second base station.

Some examples of the method, apparatuses, and non-transitory computer-readable medium described herein may further include operations, features, means, or instructions for receiving an overload indication from the second base station, the overload indication including an indication of interfered time-frequency resources of the second cell, determining remote interference of the first cell to the second cell for the interfered time-frequency resources, and sending an indication of the remote interference to the second base station.

A method of wireless communication is described. The method may include receiving, at a first base station deploying a first cell operating according to a first TDD configuration, an indication of an RI-RS to be transmitted via a second cell deployed by a second base station, the second cell operating according to a second TDD configuration that is synchronized in time with the first TDD configuration, monitoring for the RI-RS transmitted from the second base station in at least a portion of a first uplink TTI of the first TDD configuration, and sending an interference report to the second base station, the remote interference report being based on the monitoring for the RI-RS.

An apparatus for wireless communication is described. The apparatus may include a processor, memory in electronic communication with the processor, and instructions stored in the memory. The instructions may be executable by the processor to cause the apparatus to receive, at a first base station deploying a first cell operating according to a first TDD configuration, an indication of an RI-RS to be transmitted via a second cell deployed by a second base station, the second cell operating according to a second TDD configuration that is synchronized in time with the first TDD configuration, monitor for the RI-RS transmitted from the second base station in at least a portion of a first uplink TTI of the first TDD configuration, and send an interference report to the second base station, the remote interference report being based on the monitoring for the RI-RS.

Another apparatus for wireless communication is described. The apparatus may include means for receiving, at a first base station deploying a first cell operating according to a first TDD configuration, an indication of an RI-RS to be transmitted via a second cell deployed by a second base station, the second cell operating according to a second TDD configuration that is synchronized in time with the first TDD configuration, monitoring for the RI-RS transmitted from the second base station in at least a portion of a first uplink TTI of the first TDD configuration, and sending an interference report to the second base station, the remote interference report being based on the monitoring for the RI-RS.

A non-transitory computer-readable medium storing code for wireless communication is described. The code may include instructions executable by a processor to receive, at a first base station deploying a first cell operating according to a first TDD configuration, an indication of an RI-RS to be transmitted via a second cell deployed by a second base station, the second cell operating according to a second TDD configuration that is synchronized in time with the first TDD configuration, monitor for the RI-RS transmitted from the second base station in at least a portion of a first uplink TTI of the first TDD configuration, and send an interference report to the second base station, the remote interference report being based on the monitoring for the RI-RS.

Some examples of the method, apparatuses, and non-transitory computer-readable medium described herein may further include operations, features, means, or instructions for detecting, by the first base station, interference from the second base station and sending, to the second base station, a request for transmission of the RI-RS.

Some examples of the method, apparatuses, and non-transitory computer-readable medium described herein may further include operations, features, means, or instructions for sending an overload indication to the second base station based on detecting the interference and receiving, from the second base station in response to the overload indication, an indication of remote interference of the second cell to the first cell, where the request for the RI-RS may be based on the indication of remote interference.

In some examples of the method, apparatuses, and non-transitory computer-readable medium described herein, the overload indication includes an indication of interfered time-frequency resources of the first cell.

In some examples of the method, apparatuses, and non-transitory computer-readable medium described herein, the indication of the RI-RS includes at least one of a periodicity of the RI-RS, resources associated with the RI-RS, or a sequence for the RI-RS.

In some examples of the method, apparatuses, and non-transitory computer-readable medium described herein, the detecting the RI-RS may include operations, features, means, or instructions for identifying a beam identifier associated with the RI-RS.

Some examples of the method, apparatuses, and non-transitory computer-readable medium described herein may further include operations, features, means, or instructions for performing an interference cancellation operation on a received uplink transmission in a second uplink TTI to suppress a transmission from the second base station, the interference cancellation operation based on the detected RI-RS.

In some examples of the method, apparatuses, and non-transitory computer-readable medium described herein, the interference report includes at least one of a location of the first base station, an observed delay at the first base station associated with the second base station, detected power information for one or more time-frequency resources, detected signal strength for the RI-RS, or a detected transmission parameter for the RI-RS.

Some examples of the method, apparatuses, and non-transitory computer-readable medium described herein may further include operations, features, means, or instructions for performing, based on the monitoring for the RI-RS, an interference mitigation action for an uplink transmission by a user equipment served by the first cell in a second uplink TTI to mitigate interference from a transmission from the second base station over the second cell in a second cell.

In some examples of the method, apparatuses, and non-transitory computer-readable medium described herein, the performing the interference mitigation action includes modifying a power level for at least one symbol of the uplink transmission by the user equipment (UE).

Some examples of the method, apparatuses, and non-transitory computer-readable medium described herein may further include operations, features, means, or instructions for transmitting, to the UE, an indication for transmission of a demodulation reference signal (DMRS) associated with the at least one symbol of the uplink transmission.

Some examples of the method, apparatuses, and non-transitory computer-readable medium described herein may further include operations, features, means, or instructions for transmitting, to the UE, a first power control command for the at least one symbol of the uplink transmission and a second power control command for other symbols of the uplink transmission.

Some examples of the method, apparatuses, and non-transitory computer-readable medium described herein may further include operations, features, means, or instructions for transmitting, to the UE, a power control delta associated with the at least one symbol of the uplink transmission.

In some examples of the method, apparatuses, and non-transitory computer-readable medium described herein, the performing the interference mitigation action includes modifying a transmission duration for the uplink transmission by the UE in the second uplink TTI.

In some examples of the method, apparatuses, and non-transitory computer-readable medium described herein, the performing the interference mitigation action may be based on a first loading level associated with the first base station and a second loading level associated with the second base station.

A method of wireless communication is described. The method may include receiving, at a first base station, an RI-RS request from a second base station, the first base station deploying a first cell operating according to a first TDD configuration and the second base station deploying a second cell operating according to a second TDD configuration that is synchronized in time with the first TDD configuration, transmitting an RI-RS over at least a portion of a first downlink TTI, receiving an interference report from the second base station, the interference report being based on the transmitted RI-RS, and performing an interference mitigation action for a transmission in a second downlink TTI based on the interference report.

An apparatus for wireless communication is described. The apparatus may include a processor, memory in electronic communication with the processor, and instructions stored in the memory. The instructions may be executable by the processor to cause the apparatus to receive, at a first base station, an RI-RS request from a second base station, the first base station deploying a first cell operating according to a first TDD configuration and the second base station deploying a second cell operating according to a second TDD configuration that is synchronized in time with the first TDD configuration, transmit an RI-RS over at least a portion of a first downlink TTI, receive an interference report from the second base station, the interference report being based on the transmitted RI-RS, and perform an interference mitigation action for a transmission in a second downlink TTI based on the interference report.

Another apparatus for wireless communication is described. The apparatus may include means for receiving, at a first base station, an RI-RS request from a second base station, the first base station deploying a first cell operating according to a first TDD configuration and the second base station deploying a second cell operating according to a second TDD configuration that is synchronized in time with the first TDD configuration, transmitting an RI-RS over at least a portion of a first downlink TTI, receiving an interference report from the second base station, the interference report being based on the transmitted RI-RS, and performing an interference mitigation action for a transmission in a second downlink TTI based on the interference report.

A non-transitory computer-readable medium storing code for wireless communication is described. The code may include instructions executable by a processor to receive, at a first base station, an RI-RS request from a second base station, the first base station deploying a first cell operating according to a first TDD configuration and the second base station deploying a second cell operating according to a second TDD configuration that is synchronized in time with the first TDD configuration, transmit an RI-RS over at least a portion of a first downlink TTI, receive an interference report from the second base station, the interference report being based on the transmitted RI-RS, and perform an interference mitigation action for a transmission in a second downlink TTI based on the interference report.

Some examples of the method, apparatuses, and non-transitory computer-readable medium described herein may further include operations, features, means, or instructions for receiving an overload indication from the second base station, the overload indication including an indication of interfered time-frequency resources of the second cell, determining remote interference of the first cell to the second cell for the interfered time-frequency resources and sending an indication of the remote interference to the second base station.

In some examples of the method, apparatuses, and non-transitory computer-readable medium described herein, the determining the remote interference may be based on at least one of an indication of interfered resources in the overload indication, scheduled resources on the first cell, a location of the second base station relative to the first base station, or a beam direction for a beam associated with the first cell.

Some examples of the method, apparatuses, and non-transitory computer-readable medium described herein may further include operations, features, means, or instructions for sending, to the second base station, an indication of the RI-RS, the indication including at least one of a periodicity of the RI-RS, resources associated with the RI-RS, or a sequence for the RI-RS.

Some examples of the method, apparatuses, and non-transitory computer-readable medium described herein may further include operations, features, means, or instructions for transmitting, to at least one UE served by the first base station, a rate matching indication for the RI-RS, the rate matching indication including at least one of a periodicity of the RI-RS or resources associated with the RI-RS.

In some examples of the method, apparatuses, and non-transitory computer-readable medium described herein, the transmitting the RI-RS may include operations, features, means, or instructions for transmitting a first RI-RS via a first beam, the first RI-RS including a first beam identifier for the first beam.

In some examples of the method, apparatuses, and non-transitory computer-readable medium described herein, the transmitting the RI-RS may include operations, features, means, or instructions for transmitting a second RI-RS via a second beam, the second RI-RS including a second beam identifier for the second beam, where the first and second RI-RS are multiplexed using time domain multiplexing or frequency domain multiplexing, or the first RI-RS is transmitted using a first RI-RS sequence and the second RI-RS is transmitting using a second RI-RS sequence. In some examples of the method, apparatuses, and non-transitory computer-readable medium described herein, the interference report includes at least one of a location of the second base station, an observed delay at the second base station associated with the first cell, detected power information for one or more time-frequency resources, detected signal strength for the RI-RS, or a detected transmission parameter for the RI-RS.

In some examples of the method, apparatuses, and non-transitory computer-readable medium described herein, the performing the interference mitigation action includes at least one of modifying a reference signal configuration for the first base station, modifying a transmission power for at least one time-frequency resource of the second downlink TTI, modifying a number of symbols of a downlink physical shared channel transmission in the second downlink TTI, suppressing scheduling for at least one beam for the second downlink TTI, or suppressing scheduling for at least one transmission layer for the second downlink TTI.

In some examples of the method, apparatuses, and non-transitory computer-readable medium described herein, the performing the interference mitigation action may be based on a first loading level associated with the first base station and a second loading level associated with the second base station.

In some examples of the method, apparatuses, and non-transitory computer-readable medium described herein, the RI-RS includes at least one sequence repeated across a set of time periods.

BRIEF DESCRIPTION OF THE DRAWINGS

FIGS. 4A, 4B, and 4C illustrate examples of mitigation techniques that support management of remote interference in time division duplexing networks in accordance with aspects of the present disclosure.

DETAILED DESCRIPTION

Figure 1:
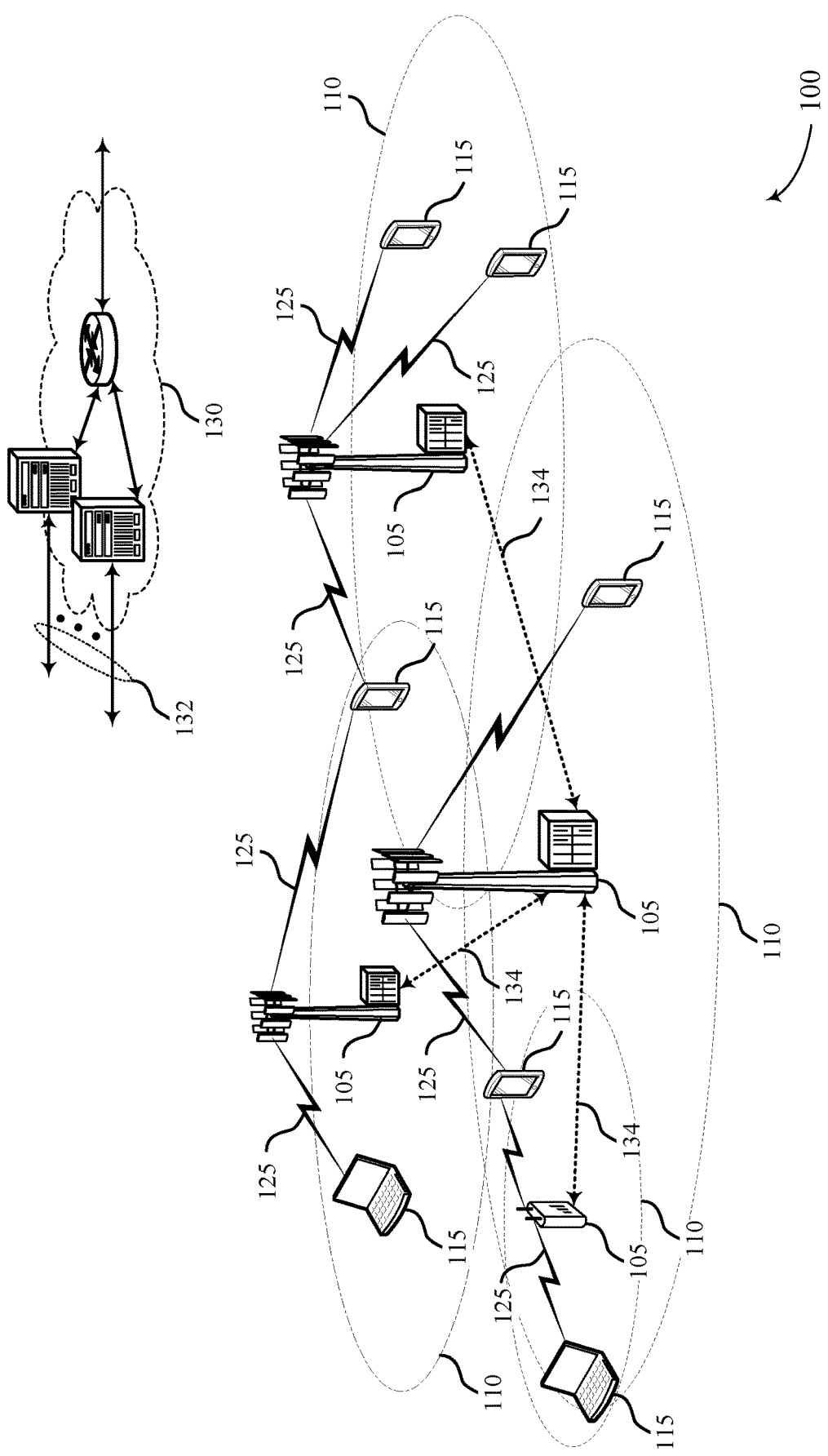
FIG. 1 illustrates an example of a wireless communications system that supports management of remote interference in time division duplexing networks in accordance with aspects of the present disclosure.

A wireless communications system may support multiple base stations operating according to time division duplexing (TDD) configurations. The TDD configurations may have some transmission time intervals (TTIs) configured for downlink transmissions, some TTIs configured for uplink transmissions, and some time periods configured for switching between downlink and uplink transmissions (e.g., special subframes or guard periods). In some cases, the TDD configurations for multiple base stations may be time-aligned. The base stations may simultaneously transmit downlink information in downlink TTIs or slots and receive uplink information in subsequent uplink TTIs or slots. To support low latency operation, the TDD configurations may switch often (e.g., more than twice per every 10 ms frame) between downlink TTIs and an uplink TTIs.

In some cases, transmissions from one of the base stations may experience variable propagation conditions. When the transmissions have strong propagation conditions in directions of other base stations, the base station may be referred to as an aggressor base station because of the possible effect of the transmissions on the other base stations. In some cases, the aggressor base station's downlink transmissions may reach another base station with a synchronized TDD configuration (referred to here as the victim base station) that is outside the typical service area of the aggressor base station. Based on the distance between the aggressor base station and the victim base station, the downlink transmission from the aggressor base station may reach the victim base station during an uplink slot or field of the TDD configuration. Thus, the downlink transmission from the aggressor base station may interfere with uplink transmissions of user equipments (UEs) served by the victim base station. In some cases, a wireless system may adjust a guard interval between the uplink and downlink TTIs or fields to compensate for interference between the uplink and downlink TTIs. However, in a wireless communications system supporting low latency that frequently switches from uplink to downlink, increasing a guard interval may greatly decrease throughput due to the frequent switching.

According to various aspects, the base stations may implement techniques to identify and mitigate interference from the aggressor base station. The techniques include a signal transmitted by a base station that enhances detection of interference between the aggressor base station and the victim base station. The signal may be referred to as a remote interference reference signal (RI-RS). In some cases, the RI-RS may be based on another signal design, such as a channel state information reference signal (CSI-RS), a cell-specific reference signal (CRS) or a tracking reference signal (TRS). In cases where the aggressor base station transmits the RI-RS, the aggressor base station may transmit the RI-RS at the end of the downlink TTI which is anticipated to overlap with the uplink transmission and result in interference. The victim base station may identify the aggressor base station based on the signal and measure the interference caused by the aggressor base station. The victim base station may transmit an indication of the interference to the aggressor base station, for example via backhaul links.

In other cases, the victim base station may transmit the RI-RS to the aggressor base station in response to detecting remote interference from the aggressor base station (e.g., interference that may be attributable to the aggressor base station). The aggressor base station may measure remote interference based on receiving the RI-RS from the victim base station.

In some cases, the interference may be mitigated by modifying transmission at the aggressor base station. For example, the aggressor base station may skip or reduce transmission of CRS or CSI-RS in a subframe or slot prior to the guard period. In some other examples, the aggressor base station may transmit with reduced power or skip transmission during the last symbols of the downlink transmission. In some cases, the aggressor base station may adjust transmission of CRS/CSI-RS and either transmit with reduced power or skip transmission during the last symbols.

In some examples, the interference may be mitigated by modifying uplink scheduling at the victim base station. For example, the UE transmitting the interfered uplink transmission to the victim base station may apply different power levels for different symbols in the interfered uplink transmission. In some cases, the victim base station may adjust rate matching information to instruct the interfered UE to start uplink transmission during a later symbol period.

Aspects of the disclosure are initially described in the context of a wireless communications system. Aspects of the disclosure are further illustrated by and described with reference to apparatus diagrams, system diagrams, and flowcharts that relate to management of remote interference in time division duplexing networks.

FIG. 1 illustrates an example of a wireless communications system 100 that supports management of remote interference in time division duplexing networks in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

An aggressor base station 105 and a victim base station 105 may implement techniques to identify and mitigate interference from the aggressor base station 105. As described herein, propagation conditions may be strong enough for downlink transmission from the aggressor base station 105 to arrive at the victim base station 105. The distance between the base stations 105 may result in the propagated downlink transmission that arrive at the victim base station 105 during an uplink TTI and interfere with uplink transmissions to the victim base station 105.

In some cases, a base station 105 may transmit a signal, such as an RI-RS, that enhances detection of interference caused by the aggressor base station 105 at the victim base station 105. The base station 105 may transmit the RI-RS at the end of the downlink TTI which is anticipated to overlap with the uplink transmission and result in interference. The other base station 105 may identify the base station 105 transmitting the RI-RS based on the signal and measure the interference that may be caused by the aggressor base station 105. In some cases, the victim base station 105 may transmit an indication of the interference to the aggressor base 105 station via backhaul links 134. The aggressor base station 105 or the victim base station 105 may then implement a mitigation technique based on the interference indication and other information exchanged via backhaul links 134. For example, the interference may be mitigated by modifying transmission at the aggressor base station 105 or by modifying uplink scheduling at the victim base station 105.

In some cases, the victim base station 105 may detect the interference and transmit a signal, such as an RI-RS, that enhances detection of interference caused by the aggressor base station 105 to the victim base station 105. The aggressor base station 105 may identify the interference that is likely to be caused by transmissions from the aggressor base station 105. The aggressor base station 105 or the victim base station 105 may then implement a mitigation technique based on the interference indication and other information exchanged via backhaul links 134. For example, the interference may be mitigated by modifying transmission at the aggressor base station 105 or by modifying uplink scheduling at the victim base station 105.

Figure 2:
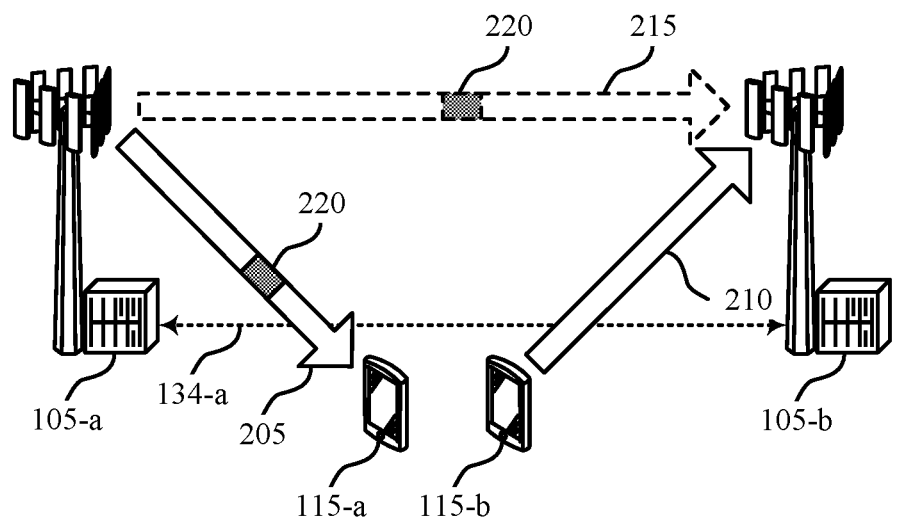
FIG. 2 illustrates an example of a wireless communications system that supports management of remote interference in time division duplexing networks in accordance with aspects of the present disclosure.

FIG. 2 illustrates an example of a wireless communications system 200 that supports management of remote interference in time division duplexing networks in accordance with aspects of the present disclosure. In some examples, wireless communications system 200 may implement aspects of wireless communications system 100.

The wireless communications system 200 may support a synchronized TDD configuration for multiple base stations 105, including a first base station 105-a and a second base station 105-b. The wireless communications system 200 may have strict latency requirements, such that the synchronized TDD configuration switches often between a downlink TTI and an uplink TTI. The base stations 105 may simultaneously transmit downlink information in downlink TTIs and receive uplink information in subsequent uplink TTIs. For example, the first base station 105-a may transmit downlink information to UE 115-a on a downlink connection 205 at the same time the second base station 105-a transmits downlink information to UE 115-b. Similarly, UE 115-b may transmit uplink information to the second base station 105-b on uplink connection 210 at the same time UE 115-a would transmit uplink information to the first base station 105-a.

The first base station 105-a and the second base station 105-b may be relatively far away from each other (e.g., outside a normal service coverage area for each of the base stations). The first base station 105-a and the second base station 105-b may be connected via backhaul link 134-a, which may be a direct or indirect physical link (e.g., backhaul link may include a direct physical connection between the base stations, or the physical backhaul link may go through a core network). Backhaul link 134-a may include wired or wireless links, and may operate according to a backhaul communication protocol (e.g., X2 or Xn interface).

At certain times, transmissions over a cell by the first base station 105-a may have strong propagation conditions in a direction of the second base station 105-b. In some cases, downlink transmissions from the first base station 105-a may propagate much farther than in usual conditions, and may reach the second base station 105-b with a substantial amount of signal power. Based on the distance between the first base station 105-a and the second base station 105-b, the propagated downlink transmission 215 may reach the second base station 105-b during an uplink TTI of the TDD configuration. Thus, the propagated downlink transmission 215 from the first base station 105-a may interfere with an uplink transmission from UE 115-b to the second base station 105-b. In this scenario, the first base station 105-a may be referred to as an aggressor base station and the second base station 105-b may be referred to as a victim base station. However, it should be understood that in other scenarios (e.g., other propagation conditions), the second base station 105-b may become an aggressor base station to the first base station 105-a or other base stations.

The base stations 105 may implement techniques to enhance identification and interference mitigation of signals from the aggressor base station 105-a. For example, base station 105-a may transmit an RI-RS 220 in the downlink transmission, which base station 105-b can reliably detect to identify interference. In some cases, the RI-RS 220 may be based on or re-use resources of another signal design, such as CSI-RS, CRS, or TRS. Base station 105-a may transmit the RI-RS at the end of the downlink TTI which is anticipated to overlap with an uplink TTI at base station 105-b and result in interference. The RI-RS 220 may include identifiers for the base station 105-a. Based on receiving the RI-RS 220 from base station 105-a, base station 105-b may enhance identification and mitigation of interference between base station 105-a and base station 105-b.

In some cases, base station 105-b may cause interference to base station 105-a. For example, a downlink transmission from base station 105-b may be affected by the strong propagation conditions in the direction of base station 105-a, which may cause interference of communications between base station 105-*a* and UE 115-*a*. As described herein, base station 105-*a* may detect the interference and transmit an RI-RS 220 in a downlink transmission, which base station 105-*b* can reliably detect to identify the interference. In some cases, TDD configurations such as those described herein may experience channel reciprocity. Based on channel reciprocity, enhanced propagation conditions for transmissions from base station 105-*b* may also occur for transmissions from base station 105-*a*. Therefore, in some cases, the victim base station 105-*b* may be configured to detect interference and transmit the RI-RS 220.

Base station 105-*b* may identify and measure interference from base station 105-*a* based on the RI-RS 220. Base station 105-*b* may send a measurement of the received interference to base station 105-*a* (e.g., via backhaul links 134-*a*). In some cases, the measurement report may include the detected RI-RS with the corresponding strength and, if present, beam or antenna information. The measurement report may also include a detected RI-RS numerology (e.g., subcarrier spacing) and bandwidth. Additional information may be exchanged via backhaul links 134-*a*, such as a location of base station 105-*a* and a detected timing advance or observed delay at base station 105-*b*. The observed delay may be determined by comparing the receiving timing information of the signal to a reference time, such as Global Positioning System (GPS) time, a network downlink time, etc. In some cases, the measurement report may also indicate how many or which symbol periods were affected by the propagated downlink transmission 215. In some cases, base station 105-*a* and base station 105-*b* may exchange TDD configuration information. For example, the base stations 105 may use different TDD configurations, and exchanging the TDD configuration of base station 105-*b* may assist base station 105-*a* in identifying the caused interference. The TDD configurations may be synchronized in the time domain while differing in, for example, bandwidth, center frequency, control channel configurations, reference signal configurations, and other parameters. In some cases, base station 105-*a* and base station 105-*b* may use the same TDD configuration, including a same symbol pattern for a slot. In some examples, base station 105-*a* and base station 105-*b* may use different, but synchronized, TDD configurations.

Base station 105-*a* may detect interference from base station 105-*b* and may transmit an RI-RS to base station 105-*b*. Base station 105-*b* may identify and measure the interference based on the RI-RS transmitted by base station 105-*a*. Base station 105-*b* may send a measurement of the received interference to base station 105-*a* (e.g., via backhaul links 134-*a*). In some cases, the measurement report may include the detected RI-RS with the corresponding strength and, if present, beam or antenna information. The measurement report may also include a detected RI-RS numerology (e.g., subcarrier spacing) and bandwidth. Additional information may be exchanged via backhaul links 134-*a*, such as a location of base station 105-*b* and a detected timing advance or observed delay at base station 105-*a*. The observed delay may be determined by comparing the receiving timing information of the signal to a reference time, such as Global Positioning System (GPS) time, a network downlink time, etc. In some cases, the measurement report may also indicate how many or which symbol periods were affected by the propagated downlink transmission 215. In some cases, base station 105-*b* and base station 105-*a* may exchange TDD configuration information. For example, the base stations 105 may use different TDD configurations, and exchanging the TDD configuration of base station 105-*a* may assist base station 105-*b* in identifying the caused interference. The TDD configurations may be synchronized in the time domain while differing in, for example, bandwidth, center frequency, control channel configurations, reference signal configurations, and other parameters.

If base station 105-*b* can identify base station 105-*a* based on observations of the interference (e.g., detected CRS/CSI-RS/TRS), base station 105-*b* may send base station 105-*a* a request to transmit the RI-RS 220 to confirm or enhance detection of the interference. However, in a remote interference scenario, the victim base station 105 may not be able to initially identify the aggressor base station 105. To facilitate identification, the victim base station 105 may report measured interference to neighboring base stations via an overload indication prior to receiving an RI-RS 220. The overload indication may include interference measurements for different frequency resources. In some cases, the victim base station 105 may transmit the overload indication if there is a suspected aggressor base station 105. The neighboring base stations 105 may receive the overload indication and correlate the affected frequency resources with their prior scheduled transmissions for the affected TTIs to determine if they are the possible aggressor. If a base station 105 determines that it is a possible aggressor base station for the interference, it may indicate the possible interference to the victim base station 105 and the victim base station 105 may request transmission of the RI-RS 220.

In some cases, base station 105-*a* may indicate to or configure UEs 115 to rate match around RI-RS 220. In some cases, the indication of rate matching may be done explicitly or by allocating less time resources to the UEs 115. For example, if RI-RS 220 follows the same pattern as CSI-RS, RI-RS 220 may be signaled as an additional zero power CSI-RS to rate match around. The periodicities and locations of RI-RS, and thus the indication of rate matching, may be different for different slots, TTIs, or special subframes. For example, RI-RS 220 may be transmitted in a first special subframe in a radio frame or with a periodicity that is different from some other CSI-RS periodicities.

In some examples, base station 105-*a* may send an indication to base station 105-*b* of the RI-RS 220. Base station 105-*b* may monitor for the RI-RS 220 based on the indication. The indication of RI-RS may include the periodicity, the resources used, and the sequences used for the RI-RS 220. In some cases, multiple candidate aggressor base stations 105 may transmit indications of RI-RS. Base station 105-*b* may detect the RI-RS 220 and determine which of the base stations 105 is causing or experiencing interference based on the RI-RS 220 and the indications. In some cases, the indication of RI-RS may include a sparse periodicity (for example, an RI-RS transmission in only a subset of the special subframes).

In situations where the second base station 105-*b* becomes an aggressor base station to the first base station 105-*a* or other base stations, victim base station 105-*a* may send an indication to the aggressor base station 105-*b* of the RI-RS. The aggressor base station 105-*b* may monitor for the RI-RS 220 based on the indication.

In some cases, RI-RS transmission and reception may be handled by a network controller, such as an operations and management (OAM) controller. For example, an atmospheric ducting phenomenon may occur, and transmissions from base station 105-*b* may cause interference at base station 105-*a*. Base station 105-*a* may detect the interference and start to transmit the RI-RS 220. In some cases, base station 105-*a* may identify an indicator to start transmitting the RI-RS 220 to base station 105-*b*. The indicator may be, for example, a trigger or threshold detected based on experiencing the interference, or the network controller may transmit an indicator to base station 105-*a*, and base station 105-*a* may transmit the RI-RS 220 based on the indicator received from the network controller.

The network controller may then configure base station 105-*b* to monitor for the RI-RS 220. Base station 105-*b* may receive the RI-RS and report the detected RI-RS to the network controller. The network controller may send an indicator of a remote interference mitigation scheme to base station 105-*b*, and base station 105-*b* may apply the remote interference mitigation scheme. The network controller may transmit an indicator to configure base station 105-*b* from monitoring for the RI-RS 220 once the interference is stopped or mitigated. For example, the network controller may transmit the indicator after the remote interference mitigation scheme has been applied or once the atmospheric ducting phenomenon stops occurring. The network controller may also transmit an indicator which configures base station 105-*a* to stop transmitting the RI-RS 220 when the interference from base station 105-*b* stops occurring.

In some cases, the fast Fourier transform (FFT) window of base station 105-*b* may not be aligned with the propagated downlink transmission 215. To account for misalignment, the RI-RS may have synchronization and time search capabilities. For example, if a waveform including the RI-RS is repeated twice or more in time (e.g., corresponding to decimating in the frequency domain), base station 105-*b* may be able to identify the waveform even if only receiving a portion of the interference. Thus, the RI-RS 220 as shown may include two or more repeated signal portions or subsequences.

The RI-RS 220 may be generated based on identifiers known by base station 105-*a* and base station 105-*b*. For example, the RI-RS 220 may be based on a cell ID, virtual cell ID, antenna ID, beam ID, or other identifiers. In some cases, the identifiers used to generate the RI-RS 220 may be negotiated between the base stations 105 (e.g., over backhaul links 134-*a*). In some cases, the frequency and time resources used to transmit the RI-RS 220 may also be negotiated or configured between the base stations 105. In some cases, the frequency and time resources may be based on the identifiers used to generate the RI-RS 220. In some examples, different cells may use different RI-RS numerology (e.g., sequences, periodicity, or frequency resource pattern), or time-division multiplex different RI-RS numerology in the same cell.

In massive MIMO systems, the propagated downlink transmission 215 may be a result of just one or more beams or antennas. Thus, base station 105-*a* may include a beam ID or antenna ID in the RI-RS 220. Different beams may be multiplexed differently, such as according to TDM or FDM or using different sequences. The "beam" indicated by the beam ID (e.g., a beam or antenna or antenna array, etc.) may be known by base station 105-*b*. Base station 105-*b* may detect different RI-RS resources and measure the interference in those resources. In some cases, the interference may be spatially localized (e.g., coming from a single direction such as by beamforming). Base station 105-*b* may be able to detect this interference and null the interference out before the rest of the received processing. In some cases, RI-RS 220 may be configured semi-statically or indefinitely for transmission by base station 105-*a* with a certain periodicity to allow base station 105-*b* to estimate the channel for performing interference cancellation or suppression of transmissions from base station 105-*a*.

Figure 5A:
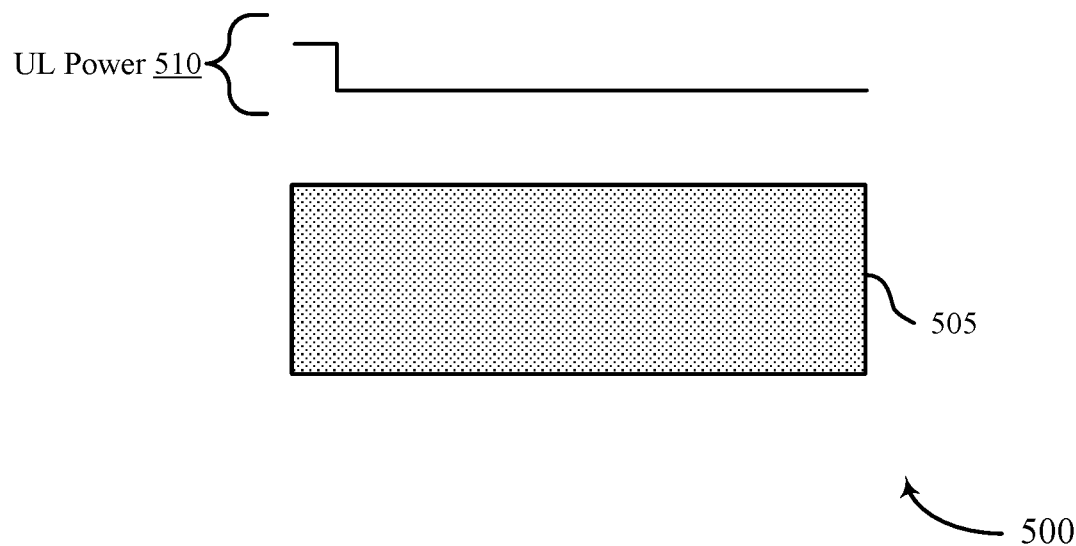
FIGS. 5A and 5B illustrate examples of mitigation techniques that support management of remote interference in time division duplexing networks in accordance with aspects of the present disclosure.
Figure 5B:
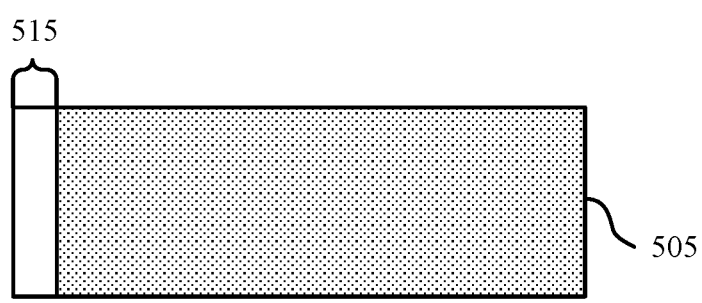
Figure 5B:
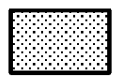

The interference may be mitigated by modifying transmission at an aggressor base station 105 or by modifying uplink scheduling at a victim base station 105. Different examples of modifying transmission at the aggressor base station 105 are shown in FIGS. 4A, 4B, and 4C, and examples of modifying uplink scheduling at the victim base station 105 are shown in FIGS. 5A and 5B.

Figure 3:
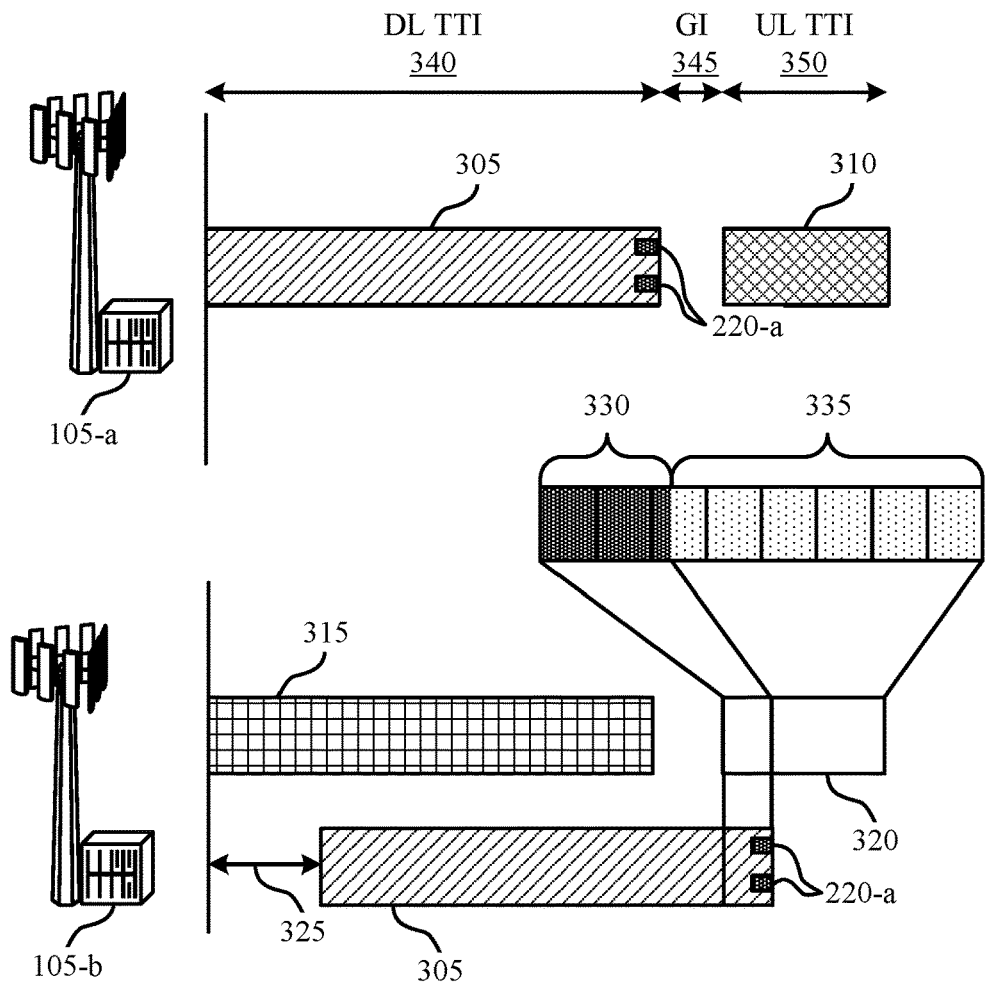
FIG. 3 illustrates an example of an interference timing diagram that supports management of remote interference in time division duplexing networks in accordance with aspects of the present disclosure.

FIG. 3 illustrates an example of an interference timing diagram 300 that supports management of remote interference in time division duplexing networks in accordance with aspects of the present disclosure. In some examples, interference timing diagram 300 may implement aspects of wireless communications system 100 or 200.

Base station 105-*a* and base station 105-*b* may transmit downlink information simultaneously during downlink TTI 340. In this example, base station 105-*a* may be the aggressor base station 105, and base station 105-*b* may be the victim base station 105. In some other examples (e.g., as described in FIG. 2), base station 105-*a* may be the victim base station 105 and base station 105-*b* may be the aggressor base station 105.

Base station 105-*a* transmits the downlink transmission 305 to UEs 115 served via a first cell by base station 105-*a*, and base station 105-*b* transmits the downlink transmission 315 to UEs 115 served via a second cell by base station 105-*b* at the same time. The downlink TTI 340 and the uplink TTI 350 may be respective examples of downlink slots and uplink slots separated by a guard time, shown by the guard interval 345. In some other examples, the downlink TTI 340 and the uplink TTI 350 may be respective examples of a downlink pilot time slot (DwPTS) and an uplink pilot time slot (UpPTS) separated by a guard period (e.g., the guard interval 345) of a special subframe. A UE 115 may transmit an uplink transmission 310 to base station 105-*a* during uplink TTI 350.

As described in FIG. 2, the first cell served by base station 105-*a* may have strong propagation characteristics, and the downlink transmission 305 may be received by base station 105-*b* with substantial signal power, even though there is a relatively long distance (e.g., a distance greater than a typical service coverage area by base stations 105) between the base stations 105. The downlink transmission 305 may be received at base station 105-*b* after a propagation delay 325, where the propagation delay 325 is based on the time taken for the downlink transmission 305 to travel from base station 105-*a* to base station 105-*b*.

In some cases, the propagation delay 325 may be longer than a guard interval 345 separating a downlink TTI 340 from an uplink TTI 350. When base station 105-*b* receives the downlink transmission 305, at least a portion of the downlink transmission 305 may overlap and interfere with an uplink transmission 320 to base station 105-*b*. In an illustrated example, the uplink transmission includes two interfered symbols 330, one partially interfered symbol, and five clean symbols 335. A "clean" symbol may not have substantial interference from the downlink transmission 305.

To assist in identifying and mitigating interference from the downlink transmission 305, base station 105-*a* may transmit an RI-RS 220-*a* at the end of the downlink transmission 305. The RI-RS 220-*a* may be an examples of an RI-RS 220 as described in FIG. 2. Base station 105-*b* may receive the RI-RS 220-*a* and identify base station 105-*a* as the aggressor base station 105.

In situations where the base station 105-*b* is an aggressor to base station 105-*a* or other base stations, base station 105-*a* may transmit an RI-RS 220-*a* to base station 105-*b* to assist in identifying and mitigating interference from base station 105-*b*. Base station 105-*b* may receive the RI-RS 220-*a* and detect a level of interference that may be representative of its own interference toward base station 105-*a*.

Upon identifying the aggressor base station 105, base station 105-*a* and base station 105-*b* may exchange additional information via backhaul links. For example, the base stations 105 may exchange location information, resource scheduling information, and select one or more mitigation techniques, such as those described in FIGS. 4A, 4B, 4C, 5A, and 5B.

In some cases, the base stations 105 may negotiate whether to select a mitigation technique which benefits the aggressor base station 105 more or the victim base station 105 more. For example, the aggressor base station 105 may indicate its downlink loading information and the victim base station 105 may indicate its uplink loading information. If there is heavy downlink traffic for the aggressor base station 105, the mitigation techniques may be biased for the aggressor base station 105. Or, if there is heavy uplink traffic for the victim base station 105, the mitigation techniques may be biased for the victim base station 105.

In some cases, a first mitigation technique may be used for a first set of TTIs, and a second, different mitigation technique may be used for a second set of TTIs. For example, the victim base station 105 may reduce uplink transmission for a first few subframes, then the aggressor base station 105 may reduce downlink transmission for subsequent subframes. The rate matching behavior for the sets of subframes using different mitigation techniques may be indicated dynamically or semi-statically to the UEs served by the aggressor and victim base stations via downlink control information (DCI).

In some cases, the aggressor base station 105 and the victim base station 105 may use an FDM configuration to mitigate interference. The downlink of the aggressor base station 105 may use a subset of resources that are frequency division multiplexed with resources used for uplink transmissions by the victim base station 105. The FDM configuration may be coordinated via backhaul links. In some cases, the FDM configuration may include applying an interference mitigation action to a subset of RBs or UEs 115. For example, the aggressor base station 105 may shorten RBs 0-49 by one OFDM symbol and use the whole downlink TTI in RBs 50-99. If a UE 115 is allocated both sets of RBs (e.g., a resource allocation that spans across RBs 49-50), the rate matching behavior may vary for different sets of RBs. In some cases, the aggressor base station 105 may be restricted from allocating UEs across sets of RBs with different RI-RS or remote interference mitigation applied. If UEs 115 are not able to be allocated across sets of RBs, then the aggressor base station 105 may schedule UEs within RB allocations having the same interference mitigation characteristics.

FIGS. 4A, 4B, and 4C illustrate examples of mitigation techniques 400, 401, and 402 that support management of remote interference in time division duplexing networks in accordance with aspects of the present disclosure. In some examples, the mitigation techniques 400, 401, and 402 may implement aspects of wireless communications system 100 or 200. The mitigation techniques 400, 401, and 402 describe modifying transmission at the aggressor base station 105 to mitigate interference from an aggressor base station 105 on a victim base station 105.

In each example, an aggressor base station 105 may transmit control information on a control channel 405. The control information may include DCI indicating resource allocation or TTI structure for the following downlink transmission. For example, the DCI may indicate changes for the downlink transmission corresponding to the selected mitigation technique 400, 401, or 402. In some cases, the aggressor base station 105 may be similar to base station 105-*a* of FIGS. 2 and 3, and the victim base station 105 may be similar to base station 105-*b* of FIGS. 2 and 3. In some other examples, the aggressor base station 105 may be similar to base station 105-*b* of FIGS. 2 and 3, and the victim base station 105 may be similar to base station 105-*a* of FIGS. 2 and 3.

In FIG. 4A, mitigation technique 400 shows skipping or reducing reference signal transmission in a subframe or slot before a guard period. The subframe may be a special subframe, which may be used to transition from the end of the downlink TTI to the guard period. Reference signals 410 may be distributed throughout RBs of the downlink TTI (e.g., CRS, CSI-RS, or TRS may be configured for transmission in certain resources of each RB according to cell ID or CSI-RS configuration). As shown, mitigation technique 400 may include suppressing reference signals for a section 415 of one or more resource blocks (e.g., a certain number of symbols of the one or more resource blocks). The section 415 may or may not include a portion of downlink shared channel transmissions.

In some cases, the aggressor base station 105 may be indicated that an interfered UE 115 only uses a certain set of RBs. For example, if the interfered UE 115 uses RBs 0-20, the aggressor base station 105 may refrain from transmitting data or reference signals, or both, on those RBs during a last few symbol periods of the downlink TTI. In some cases, the aggressor base station 105 may still transmit data to served UEs.

In some cases, new CSI-RS, reference signal (RS), or physical downlink shared channel (PDSCH) formats may be introduced to enable the mitigation techniques 400. In some cases, the mitigation technique 400 changes the behavior of UEs 115 served by the aggressor base station 105 based on signaling of different CRS/CSI-RS patterns (e.g., UEs 115 suppress measurements for CRS, CSI-RS, or TRS that are not present).

In FIG. 4B, mitigation technique 401 shows reducing a downlink power 420 of downlink transmissions for a last few downlink symbols. Reducing the power of the downlink transmission may reduce the interference observed by the victim base station 105, and the aggressor base station 105 may still transmit. The aggressor base station 105 may indicate the reduction in power to its served UEs 115 semi-statically or dynamically in DCI. The aggressor base station 105 may account for the reduction in power by modification of modulation and coding scheme (MCS) for the downlink transmission. In some cases, the reduction of power may be realized by changing the traffic to pilot ratio (T2P) for a last few downlink symbols.

In FIG. 4C, mitigation technique 402 shows modifying rate matching for the aggressor base station 105. For example, the aggressor base station 105 may skip transmitting on a data channel 425 in the last symbol period(s). The rate matching may be indicated to served UEs 115 in DCI transmitted in the control channel 405.

The aggressor base station 105 may implement one or more of the mitigation techniques 400, 401, and 402. For example, the base station 105 may refrain from transmitting reference signals using some RBs for a last few symbols, and the base station 105 may reduce a transmission power for the last few symbols of the downlink TTI as well.

If beam information is available, such that the aggressor base station 105 knows which beam is causing interference, the aggressor base station 105 may apply one or more of the described techniques to just the interfering beams. In some other examples, the aggressor base station 105 may choose not to schedule UEs 115 using the given beam or a given precoder (e.g., spatial layer). In one example, the aggressor base station 105 may choose its transmit precoder to minimize the interference towards the victim base station.

FIGS. 5A and 5B illustrate examples of mitigation techniques 500 and 501 that support management of remote interference in time division duplexing networks in accordance with aspects of the present disclosure. In some examples, mitigation techniques 500 and 501 may implement aspects of wireless communications system 100 or 200. The mitigation techniques 500 and 501 describe modifying scheduling at a victim base station 105 to mitigate interference at the victim base station 105 caused by an aggressor base station 105. The aggressor base station 105 may be similar to base station 105-*a* of FIGS. 2 and 3, and the victim base station 105 may be similar to base station 105-*b* of FIGS. 2 and 3. In some other examples, the aggressor base station 105 may be similar to base station 105-*b* of FIGS. 2 and 3, and the victim base station 105 may be similar to base station 105-*a* of FIGS. 2 and 3.

In FIG. 5A, mitigation technique 500 shows a UE 115 transmitting to the victim base station 105 and applying different power levels for different symbols. If a transmission is in a mini-slot (e.g., a few symbol periods) that is heavily impacted by interference, the UE 115 may increase power for those symbol periods (e.g., shown by the UE power scale 510). If the transmission is across interfered and non-interfered symbols (e.g., as shown in FIG. 3), the UE 115 can apply different power controls for different symbols.

In some cases, a power change between symbols by the UE 115 may result in a potential loss of phase continuity. Additional demodulation reference signal (DMRS) symbols may be added to the first symbol, or to symbols after the power changes, to estimate the channel before and after the phase change and estimate the covariance matrix of the interference, as interference may be different in interfered and non-interfered symbols.

The base station may effectively maintain two power control loops for different sets of symbols. In some cases, there may be a semi-static delta between both power control loops, which may be modified based on RRC or in a MAC channel element (MAC-CE). In some other examples, there may be an entirely separate loop with separate power control commands for different sets of symbols indicated in DCI.

In FIG. 5B, mitigation technique 501 shows the victim base station 105 changing rate matching information to inform an interfered UE 115 to start uplink transmission during a later symbol period. For example, if interference is detected for a first and second symbol period, but not a third symbol period, the victim base station 105 may indicate to the interfered UE 115 to start uplink transmission during the third symbol period, resulting in an uplink transmission gap 515 in the uplink transmission 505. If the victim base station 105 does not detect interference, the victim base station 105 may instruct the UE 115 to start uplink transmission during the first symbol period.

Figure 6:
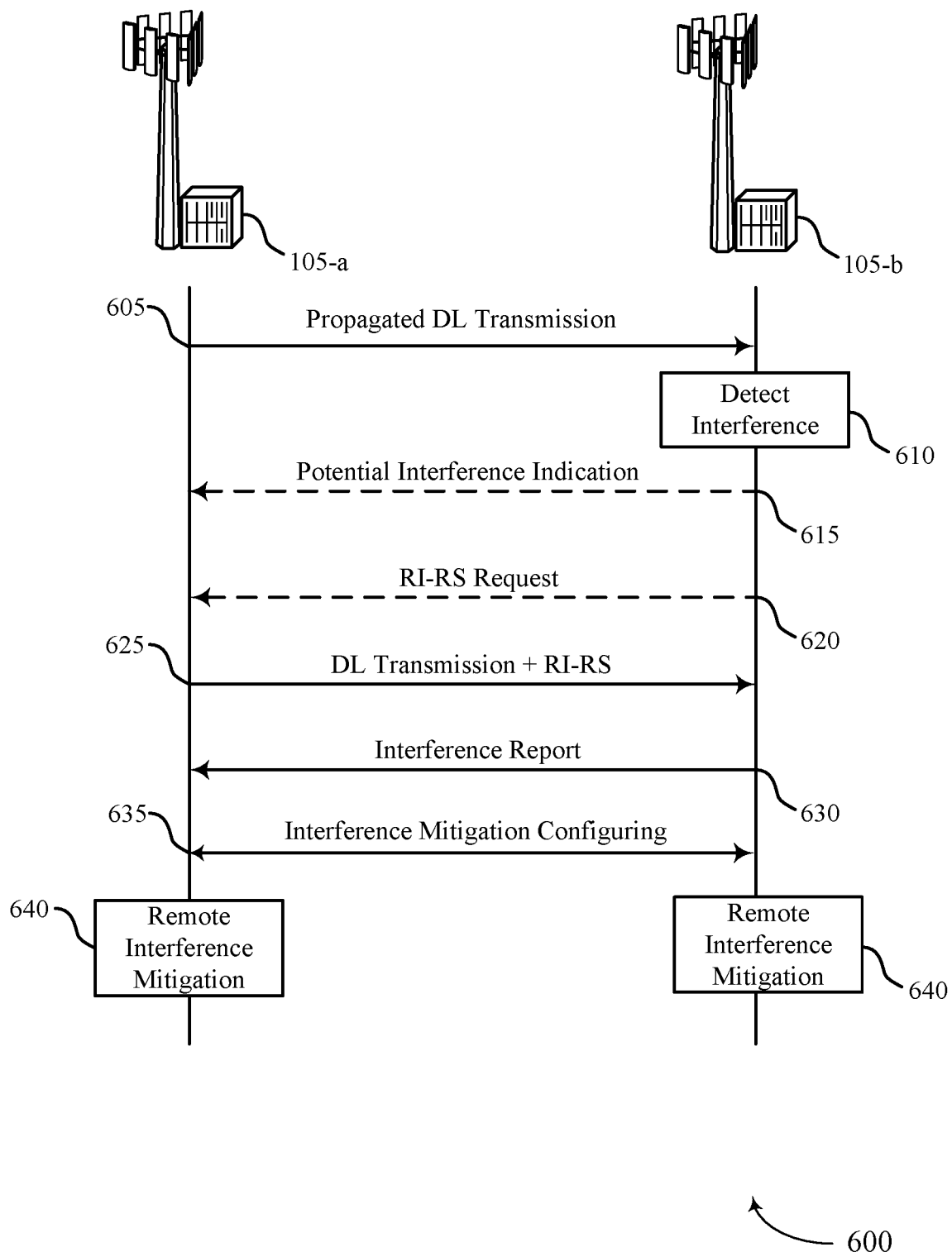
FIG. 6 illustrates an example of a process flow that supports management of remote interference in time division duplexing networks in accordance with aspects of the present disclosure.

FIG. 6 illustrates an example of a process flow 600 that supports management of remote interference in time division duplexing networks in accordance with aspects of the present disclosure. In some examples, process flow 600 may implement aspects of wireless communications system 100 or 200.

Process flow 600 includes base station 105-*a* and base station 105-*b*, which may be examples of base stations 105 as described herein. Base station 105-*a* and base station 105-*b* may use synchronized TDD configurations, where both base stations 105 transmit downlink transmissions during a downlink TTI and receive uplink transmissions during an uplink TTI. Base station 105-*a* may deploy a first cell according to a first TDD configuration, and base station 105-*b* may deploy a second cell operating according to a second TDD configuration that is synchronized in time with the first TDD configuration. In some cases, the first and second TDD configurations may be the same. Base station 105-*a* and base station 105-*b* may be relatively far apart, such that base station 105-*b* is outside of the typical service area of base station 105-*a*.

At 605, base station 105-*a* may transmit a downlink transmission to a served UE 115. However, transmissions from base station 105-*a* may have strong propagation conditions in the direction of base station 105-*b*. Base station 105-*b* may receive the downlink transmissions after a propagation delay.

At 610, base station 105-*b* may detect interference of an uplink transmission. In some cases, base station 105-*b* may not be able to determine the source of the interference. If base station 105-*b* cannot detect the source of the interference, base station 105-*b* may send an overload indication at 615 to base station 105-*a* (e.g., and other neighboring base stations) based on detecting the interference. The overload indication may include information related to the interfered time-frequency resources. If there is a correlation between the interfered frequency resources and the scheduled resources (e.g., for a prior downlink TTI corresponding to the interfered TTI) in a neighboring base station, the neighboring base station may send an indication of potential interference to base station 105-*b*. For example, base station 105-*a* may send a response to the overload indication including an indication of remote interference.

In some cases, at 620, base station 105-*b* may send a request for RI-RS. In some cases, the request for RI-RS is based on the indication of remote interference sent in response to the overload indication. In some cases, base station 105-*b* may send the request for RI-RS based on identifying the source of the interference at 610 (e.g., based on reference signals or other signals identifying the aggressor base station in the interfering transmission). In some cases, base station 105-*b* may attempt to adapt its uplink traffic prior to sending the request for RI-RS. If interference persists even after adapting uplink traffic, or if adapting uplink traffic is not feasible or desired (e.g., because of cell loading) base station 105-*b* may send the request for RI-RS without adapting uplink traffic patterns to attempt to mitigate the interference on its own.

At 625, base station 105-*a* may transmit another downlink transmission and include one or more RI-RS in the downlink transmission. In some cases, base station 105-*a* may transmit an indication of the RI-RS to be transmitted. The indication of the RI-RS may include one or more of the periodicity of the RI-RS, resources associated with the RI-RS, or a sequence for the RI-RS (e.g., identifier or seed for the RI-RS sequence). Base station 105-*b* may monitor for the RI-RS in at least a portion of a first uplink TTI of its TDD configuration. Base station 105-*b* may detect the interference, measure the interference, and send an interference report to base station 105-*a* at 630.

In some cases, base station 105-*b* may be an example of an aggressor base station 105, and base station 105-*b* may transmit a downlink transmission which causes interference at base station 105-*a*. In this example, base station 105-*a* may detect the interference at 610. In this example, the victim base station 105 may be configured to transmit the RI-RS to the aggressor base station 105. Base station 105-*a* may then transmit the RI-RS to base station 105-*b* at 625.

At 635, the base stations 105 may configure an interference mitigation action. For example, base station 105-*a* or base station 105-*b*, or both, may perform an interference mitigation action for a transmission in a second downlink TTI based on the interference report. The interference mitigation action may also be based on other parameters exchanged via backhaul links, such as cell IDs, TDD configurations, the observed delay of the interference, etc.

At 640, one or more of the base stations 105 may perform the interference mitigation action for the transmission in the second downlink TTI. The interfere mitigation actions are described in more detail in FIGS. 4A, 4B, 4C, 5A, and 5B.

Figure 7:
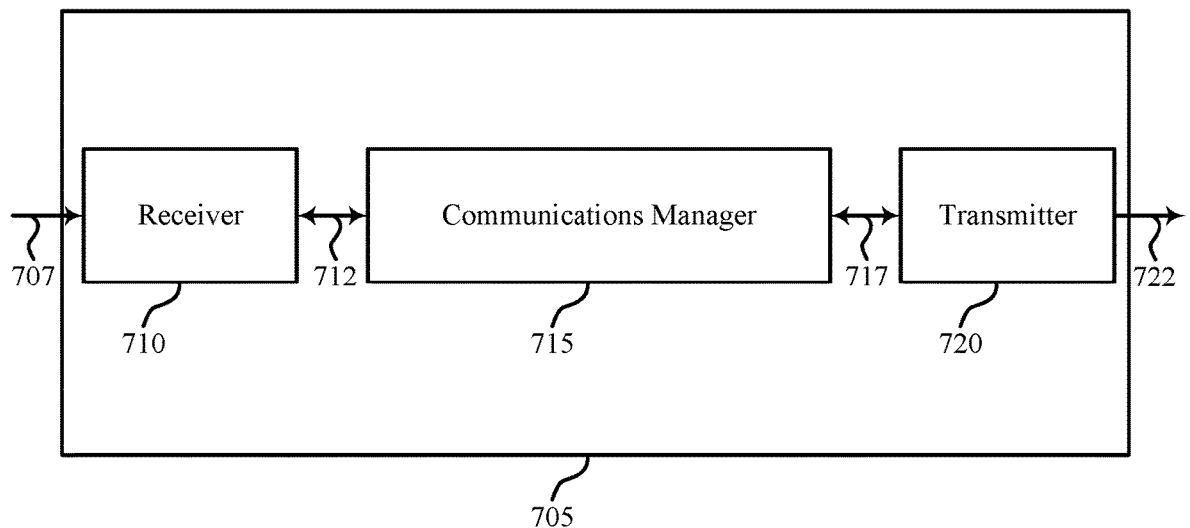
FIGS. 7 and 8 show block diagrams of devices that support management of remote interference in time division duplexing networks in accordance with aspects of the present disclosure.

FIG. 7 shows a block diagram 700 of a device 705 that supports management of remote interference in time division duplexing networks in accordance with aspects of the present disclosure. The device 705 may be an example of aspects of a base station 105 as described herein. The device 705 may include a receiver 710, a communications manager 715, and a transmitter 720. The device 705 may also include a processor. Each of these components may be in communication with one another (e.g., via one or more buses).

The receiver 710 may receive signaling 707 via one or more antennas and may perform various operations to process the signaling (e.g., down-conversion, analog-to-digital (ADC) conversion, filtering, baseband processing, etc.) This information may be passed on to other components of the device.

The receiver 710 may receive information such as packets, user data, or control information associated with various information channels (e.g., control channels, data channels, and information related to management of remote interference in time division duplexing networks, etc.) via signaling 707. Information may be passed on to other components of the device 705. The receiver 710 may be an example of aspects of the transceiver 1020 described with reference to FIG. 10. The receiver 710 may utilize a single antenna or a set of antennas.

The communications manager 715 may identify, at a first base station operating according to a first TDD configuration, an indicator to monitor for an RI-RS scheduled for transmission by a second base station, the second base station operating according to a second TDD configuration that is synchronized in time with the first TDD configuration. In some cases, the communications manager 715 may receive, at a first base station operating according to a first TDD configuration, an indication of an RI-RS to be transmitted via a second cell deployed by a second base station, the second cell operating according to a second TDD configuration that is synchronized in time with the first TDD configuration. The communications manager 715 may receive the indication of an RI-RS through a signal 712, which may be a representation of the signaling 707. In some cases, the communications manager 715 may monitor for the RI-RS from the second base station during at least a portion of a first uplink TTI of the first TDD configuration. The communications manager 715 may report measurement information associated with resources of the RI-RS based on the monitoring for the RI-RS. In some cases, the communications manager 715 may send an interference report to the second base station, the remote interference report being based on the monitoring for the RI-RS.

The communications manager 715 may also identify, at a first base station, an indicator for transmitting an RI-RS to a second base station, the first base station configured with a first TDD configuration and the second base station configured with a second TDD configuration that is synchronized in time with the first TDD configuration. The indicator may be an example of a trigger for transmitting the RI-RS. The communications manager 715 may receive the RI-RS through a signal 712, which may be a representation of signal 707. In some cases, the communications manager 715 may transmit an RI-RS over at least a portion of a first downlink TTI, receive an interference report from the second base station, the interference report being based on the transmitted RI-RS, and perform an interference mitigation action for a transmission in a second downlink TTI based on the interference report.

In other cases, the communications manager 715 may receive, at a first base station, an RI-RS request from a second base station, the first base station configured with a first TDD configuration and the second base station configured with a second TDD configuration that is synchronized in time with the first TDD configuration. The communications manager 715 may receive the RI-RS through a signal 712, which may be a representation of signal 707. In some cases, the communications manager 715 may transmit an RI-RS over at least a portion of a first downlink TTI, receive an interference report from the second base station, the interference report being based on the transmitted RI-RS, and perform an interference mitigation action for a transmission in a second downlink TTI based on the interference report. In some cases, the communication managers 715 may pass information 717 to transmitter 720. For example, the communications manager 715 may provide information 717 related to generating an RI-RS, where the RI-RS may then be transmitted using the transmitter 720. Or, in some examples, the communications manager 715 may provide information 717 related to an interference mitigation technique, which may be applied by the transmitter 720 to mitigate remote interference caused to or by the device 705. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP (digital signal processor), an application-specific integrated circuit (ASIC), a FPGA (field-programmable gate array) or other programmable logic device (PLD), discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals 722 generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
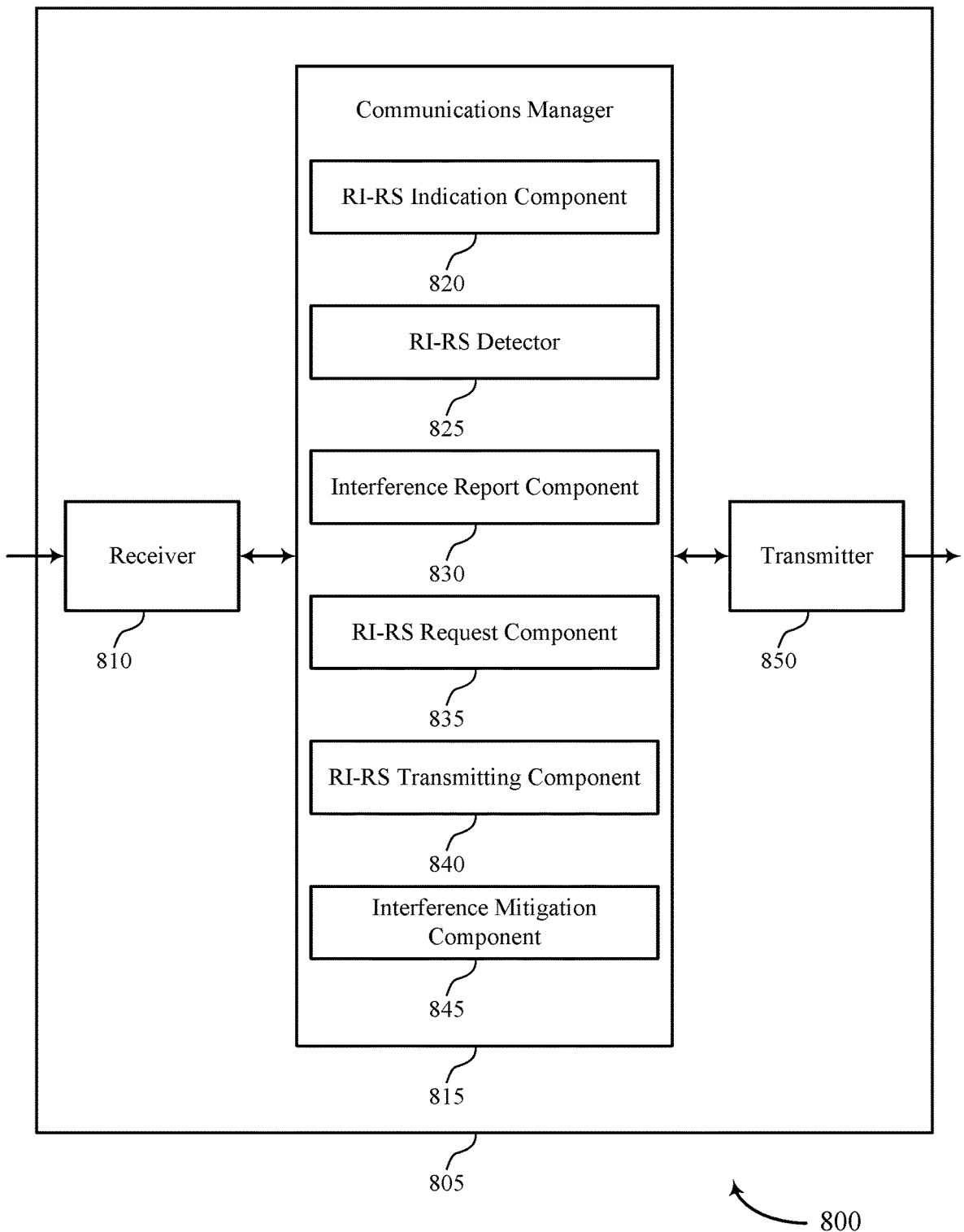

FIG. 8 shows a block diagram 800 of a device 805 that supports management of remote interference in time division duplexing networks in accordance with aspects of the present disclosure. The device 805 may be an example of aspects of a device 705 or a base station 105 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to management of remote interference in time division duplexing networks, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an RI-RS indication component 820, an RI-RS detector 825, an interference report component 830, an RI-RS request component 835, an RI-RS transmitting component 840, and an interference mitigation component 845. The communications manager 815 may be an example of aspects of the communications manager 1010 described herein.

In some cases, the RI-RS indication component 820 may identify, at a first base station operating according to a first TDD configuration, an indicator to monitor for an RI-RS scheduled for transmission by a second base station, the second base station operating according to a second TDD configuration that is synchronized in time with the first TDD configuration. The indicator may be an example of a trigger for transmitting the RI-RS. The RI-RS detector 825 may monitor for the RI-RS from the second base station during at least a portion of a first uplink TTI of the first TDD configuration. The interference report component 830 may report measurement information associated with resources of the RI-RS based on the monitoring for the RI-RS. In some cases, the RI-RS indication component 820, the RI-RS detector 825, and the interference report component 830 may each have a link to other components or elements to communicate information associated with monitoring for and receiving an RI-RS.

In other cases, the RI-RS indication component 820 may receive, at a first base station operating according to a first TDD configuration, an indication of an RI-RS to be transmitted via a second cell deployed by a second base station, the second cell operating according to a second TDD configuration that is synchronized in time with the first TDD configuration. The RI-RS detector 825 may monitor for the RI-RS from the second base station during at least a portion of a first uplink TTI of the first TDD configuration. The interference report component 830 may send an interference report to the second base station, the remote interference report being based on the monitoring for the RI-RS. In some cases, the interference report to the second base station may trigger an interference mitigation technique to be performed by the second base station. The RI-RS detector 825 may continue to monitor for RI-RS transmissions from the second base station, and the interference report component 830 may generate and send interference reports in response. If the RI-RS detector 825 stops detecting RI-RS from the second base station, it may be an indication that the interference mitigation techniques have reduced the remote interference.

In some cases, the RI-RS request component 835 may identify, at a first base station, an indicator for transmitting an RI-RS request from a second base station, the first base station configured with a first TDD configuration and the second base station configured with a second TDD configuration that is synchronized in time with the first TDD configuration. The indicator may be an example of a trigger for transmitting the RI-RS. The RI-RS transmitting component 840 may transmit the RI-RS based on the indicator, during at least a portion of a downlink TTI. The interference report component 830 may monitor for a variation in interference for the first cell based on transmitting the RI-RS. The interference report component 830 may report the variation in interference (e.g., to a network controller), and may, for example, indicate to the RI-RS transmitting component 840 to stop transmitting the RI-RS (e.g., based on the variation in interference or a communication from the network controller).

In other cases, the RI-RS request component 835 may receive, at a first base station, an remote interference reference signal (RI-RS) request from a second base station, the first base station configured with a first TDD configuration and the second base station configured with a second TDD configuration that is synchronized in time with the first TDD configuration. The RI-RS transmitting component 840 may transmit an RI-RS over at least a portion of a first downlink TTI. The interference report component 830 may receive an interference report from the second base station, the interference report being based on the transmitted RI-RS. The interference mitigation component 845 may perform an interference mitigation action for a transmission in a second downlink TTI based on the interference report.

The transmitter 850 may transmit signals generated by other components of the device 805. In some examples, the transmitter 850 may be collocated with a receiver 810 in a transceiver module. For example, the transmitter 850 may be an example of aspects of the transceiver 1020 described with reference to FIG. 10. The transmitter 850 may utilize a single antenna or a set of antennas.

Figure 9:
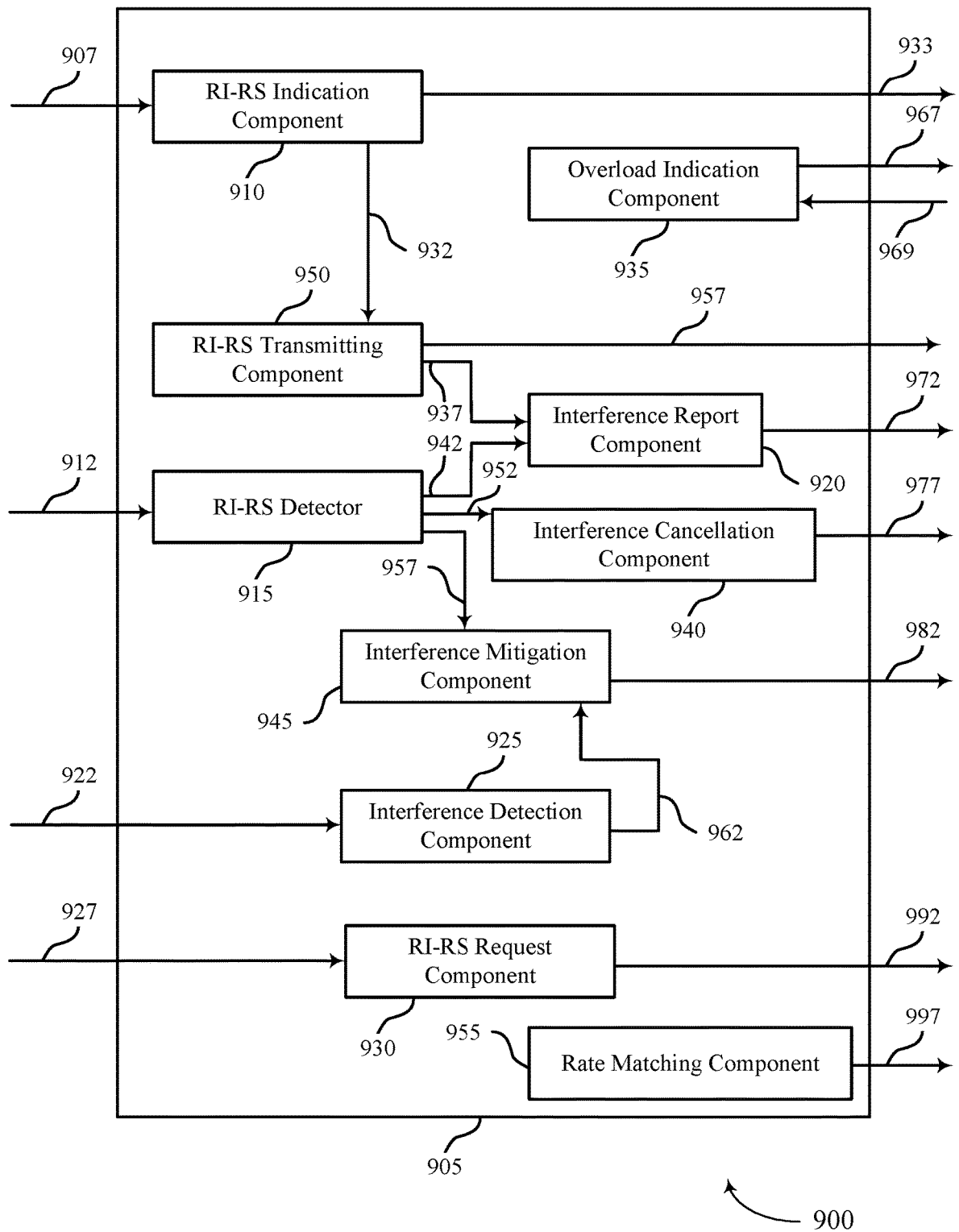
FIG. 9 shows a block diagram of a communications manager that supports management of remote interference in time division duplexing networks in accordance with aspects of the present disclosure.

FIG. 9 shows a block diagram 900 of a communications manager 905 that supports management of remote interference in time division duplexing networks in accordance with aspects of the present disclosure. The communications manager 905 may be an example of aspects of a communications manager 715, a communications manager 815, or a communications manager 1010 described herein. The communications manager 905 may include an RI-RS indication component 910, an RI-RS detector 915, an interference report component 920, an interference detection component 925, an RI-RS request component 930, an overload indication component 935, an interference cancellation component 940, an interference mitigation component 945, an RI-RS transmitting component 950, and a rate matching component 955. Each of these modules may communicate, directly or indirectly, with one another (e.g., via one or more buses).

In some cases, the RI-RS indication component 910 may identify, at a first base station operating according to a first TDD configuration, an indicator 907 to monitor for an RI-RS to be transmitted via a second cell deployed by a second base station, the second cell operating according to a second TDD configuration that is synchronized in time with the first TDD configuration. The indicator 907 may, for example, be an example of a trigger detected by an interference measuring component at the first base station. The indicator 907 may indicate to the first base station the presence of remote interference to the first base station caused by the second base station.

In other cases, the RI-RS indication component 910 may receive, at a first base station operating according to a first TDD configuration, the indication 907 of an RI-RS to be transmitted via a second cell deployed by a second base station, the second cell operating according to a second TDD configuration that is synchronized in time with the first TDD configuration. In some cases, the indication 907 received at the first base station may be transmitted by the second base station or by a network device.

In some examples, the RI-RS indication component 910 may send, to the second base station, an indication 933 of the RI-RS, the indication 933 including at least one of a periodicity of the RI-RS, resources associated with the RI-RS, or a sequence for the RI-RS. In some cases, the indication of the RI-RS includes at least one of a periodicity of the RI-RS, resources associated with the RI-RS, or a sequence for the RI-RS. In some cases, the RI-RS indication component 910 may transmit an indication 932 of the RI-RS to an RI-RS transmitting component 950.

The RI-RS detector 915 may monitor, based on receiving an RI-RS indication 912, for the RI-RS from the second base station during at least a portion of a first uplink TTI of the first TDD configuration. In some examples, the RI-RS detector 915 may identify a beam identifier associated with the RI-RS based on receiving the RI-RS indication 912. In some cases, the RI-RS indication 912 may be similar to the indication 932, where the first base station (e.g., providing an aggressor cell) monitors for the RI-RS from the second base station (e.g., providing a victim cell) based on receiving the RI-RS indication 912 to support remote interference mitigation.

In some examples, the interference report component 920 may report measurement information 972 associated with resources of the RI-RS based on monitoring for the RI-RS. In some cases, the interference report 920 may report measurement information for the monitored resources to the second base station (e.g., that may be configured to transmit the RI-RS on those resources). Upon detecting an RI-RS, the RI-RS detector 915 may transmit an indication 942 of the RI-RS to interference report component 920. In some cases, the interference report including the measurement information 972 may also include at least one of a location of the first base station, an observed delay at the first base station associated with the second base station, detected power information for one or more time-frequency resources, detected signal strength for the RI-RS, or a detected transmission parameter for the RI-RS. In other examples, the interference report component 920 may send an interference report 972 to the second base station, the remote interference report 972 being based on the monitoring for the RI-RS. In some cases, the interference report includes at least one of: a location of the first base station, an observed delay at the first base station associated with the second base station, detected power information for one or more time-frequency resources, detected signal strength for the RI-RS, or a detected transmission parameter for the RI-RS.

The interference detection component 925 may detect, by the first base station, interference 922 from the second cell. Interference detection component 925 may transmit an indication 962 of the detected interference to interference mitigation component. In some examples, the RI-RS request component 930 may send, to the second base station, a request 992 for the RI-RS.

The overload indication component 935 may send an overload indication 967 to the second base station based on detecting the interference. In some examples, the overload indication component 935 may receive, from the second base station in response to the overload indication, an indication 969 of remote interference of the second cell to the first cell, where the request for the RI-RS is based on the indication of remote interference.

The interference cancellation component 940 may perform an interference cancellation operation on a received uplink transmission in a second uplink TTI to suppress a transmission from the second base station, the interference cancellation operation based on the detected RI-RS. An indication 952 of the detected RI-RS may be received from the RI-RS detector 915. In some cases, an indication 977 of the interference cancellation may be transmitted to the UE or to the second base station. For example, the indication 977 of the interference cancellation may initiate an interference mitigation technique (e.g., transmission suppression) at the second base station.

In some examples, the interference mitigation component 945 may perform, based on the monitoring for the RI-RS and receiving an indication 957 of the RI-RS from RI-RS detector 915, an interference mitigation action for an uplink transmission by a user equipment served by the first cell in a second uplink TTI to mitigate interference from a transmission from the second base station over the second cell in a second cell.

In some examples, the interference mitigation component 945 may transmit, to the UE, an indication 982 for transmission of a DMRS associated with the at least one symbol of the uplink transmission. In some cases, the DMRS may be used to estimate the channel before and after a phase change and estimate a covariance matrix of the interference.

In some examples, the interference mitigation component 945 may transmit, to the UE, interference mitigation message 982 including at least a first power control command for the at least one symbol of the uplink transmission and a second power control command for other symbols of the uplink transmission. In some examples, the interference mitigation component 945 may transmit, to the UE via the interference mitigation message 982, a power control delta associated with the at least one symbol of the uplink transmission. In some cases, the performing the interference mitigation action includes modifying a power level for at least one symbol of the uplink transmission by the UE.

In some cases, the performing the interference mitigation action includes modifying a transmission duration for the uplink transmission by the UE in the second uplink TTI, for example in the interference mitigation message 982. In some cases, the performing the interference mitigation action is based on a first loading level associated with the first base station and a second loading level associated with the second base station.

In some other examples, the RI-RS request component 930 may receive, at a first base station, an RI-RS request 927 from a second base station, the first base station configured with a first TDD configuration and the second base station configured with a second TDD configuration that is synchronized in time with the first TDD configuration.

The RI-RS transmitting component 950 may transmit an RI-RS (e.g., in an RI-RS transmission 957) over at least a portion of a first downlink TTI. In some examples, the RI-RS transmitting component 950 may transmit a first RI-RS via a first beam (e.g., in the RI-RS transmission 957), the first RI-RS including a first beam identifier for the first beam. In some cases, the RI-RS transmission 957 includes at least one sequence repeated across a set of time periods. RI-RS transmitting component may also transmitting the indication 937 of the RI-RS to interference report component 920.

In some examples, the RI-RS transmitting component 950 may transmit a second RI-RS (e.g., in the RI-RS transmission 957) via a second beam, the second RI-RS including a second beam identifier for the second beam, where the first and second RI-RS are multiplexed using time domain multiplexing or frequency domain multiplexing, or the first RI-RS is transmitted using a first RI-RS sequence and the second RI-RS is transmitting using a second RI-RS sequence. In some cases, the second RI-RS may be included in the RI-RS transmission 957. In some examples, the interference report component 920 may receive an interference report from the second base station, the interference report being based on the transmitted RI-RS. In some cases, interference report component 920 may receive an RI-RS 937 from the RI-RS transmitting component 950. In some cases, the interference report includes at least one of: a location of the second base station, an observed delay at the second base station associated with the first cell, detected power information for one or more time-frequency resources, detected signal strength for the RI-RS, or a detected transmission parameter for the RI-RS. Parameters included in the interference report may also be received from RI-RS detected 915 over signaling 942.

The interference mitigation component 945 may perform an interference mitigation action for a transmission in a second downlink TTI based on the interference report. In some cases, the base station may send an indication 982 (e.g., to the UE or to the second base station) of the performed interference mitigation action.

In some cases, the performing the interference mitigation action includes at least one of: modifying a reference signal configuration for the first base station, modifying a transmission power for at least one time-frequency resource of the second downlink TTI, modifying a number of symbols of a downlink physical shared channel transmission in the second downlink TTI, suppressing scheduling for at least one beam for the second downlink TTI, or suppressing scheduling for at least one transmission layer for the second downlink TTI. In some cases, the performing the interference mitigation action is based on a first loading level associated with the first base station and a second loading level associated with the second base station.

In some examples, the overload indication component 935 may receive an overload indication 969 from the second base station, the overload indication 969 including an indication of interfered time-frequency resources of the second cell. In some examples, the overload indication component 935 may determine remote interference of the first cell to the second cell for the interfered time-frequency resources.

In some examples, the overload indication component 935 may send an indication 967 of the remote interference to the second base station. In some cases, the overload indication 967 includes an indication of interfered time-frequency resources of the first cell. In some cases, the determining the remote interference is based on at least one of: an indication of interfered resources in the overload indication 969, scheduled resources on the first cell, a location of the second base station relative to the first base station, or a beam direction for a beam associated with the first cell.

The rate matching component 955 may transmit, to at least one UE served by the first base station, a rate matching indication 997 for the RI-RS. In some cases, the rate matching indication including at least one of a periodicity of the RI-RS or resources associated with the RI-RS.

Figure 10:
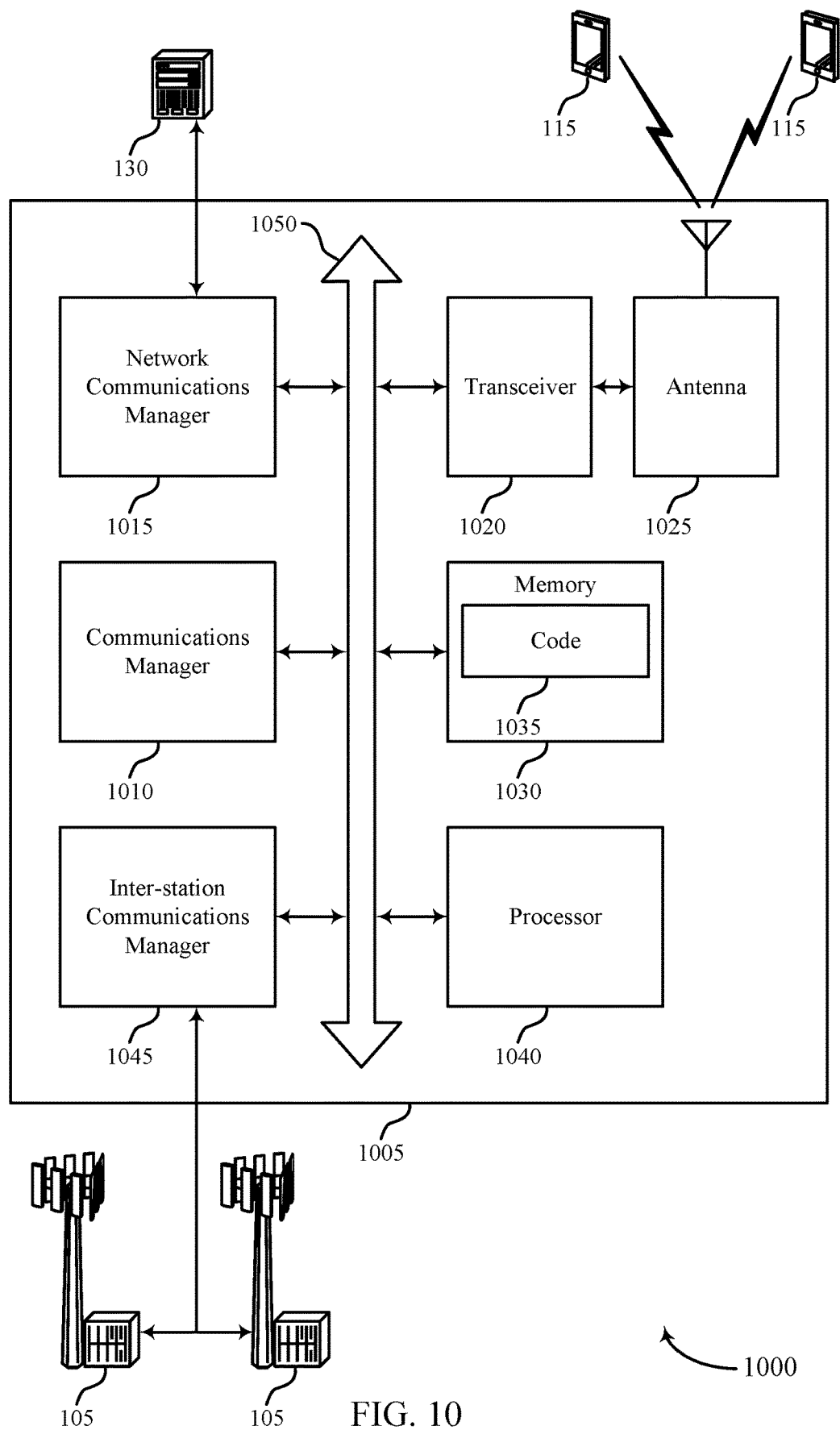
FIG. 10 shows a diagram of a system including a device that supports management of remote interference in time division duplexing networks in accordance with aspects of the present disclosure.

FIG. 10 shows a diagram of a system 1000 including a device 1005 that supports management of remote interference in time division duplexing networks in accordance with aspects of the present disclosure. The device 1005 may be an example of or include the components of device 705, device 815, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

The communications manager 1010 may identify, at a first base operating according to a first TDD configuration, an indicator to monitor for an RI-RS scheduled for transmission by a second base station, the second base station operating according to a second TDD configuration that is synchronized in time with the first TDD configuration, monitor for the RI-RS from the second base station during at least a portion of a first uplink TTI of the first TDD configuration, and report measurement associated with resources of the RI-RS based on the monitoring for the RI-RS. The communications manager 1010 may also receive, at a first base station, an indicator for transmitting an RI-RS to a second base station, the first base station configured with a first TDD configuration and the second base station configured with a second TDD configuration that is synchronized in time with the first TDD configuration, transmit the RI-RS over at least a portion of a first downlink TTI based on the indicator, and monitor for a variation in interference for the first cell based on transmitting the RI-RS.

The communications manager 1010 may receive, at a first base station operating according to a first TDD configuration, an indication of an RI-RS to be transmitted via a second cell deployed by a second base station, the second cell operating according to a second TDD configuration that is synchronized in time with the first TDD configuration, monitor for the RI-RS from the second base station during at least a portion of a first uplink TTI of the first TDD configuration, and send an interference report to the second base station, the remote interference report being based on the monitoring for the RI-RS. The communications manager 1010 may also receive, at a first base station, an RI-RS request from a second base station, the first base station configured with a first TDD configuration and the second base station configured with a second TDD configuration that is synchronized in time with the first TDD configuration, transmit an RI-RS over at least a portion of a first downlink TTI, receive an interference report from the second base station, the interference report being based on the transmitted RI-RS, and perform an interference mitigation action for a transmission in a second downlink TTI based on the interference report.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM), read only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting management of remote interference in time division duplexing networks).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
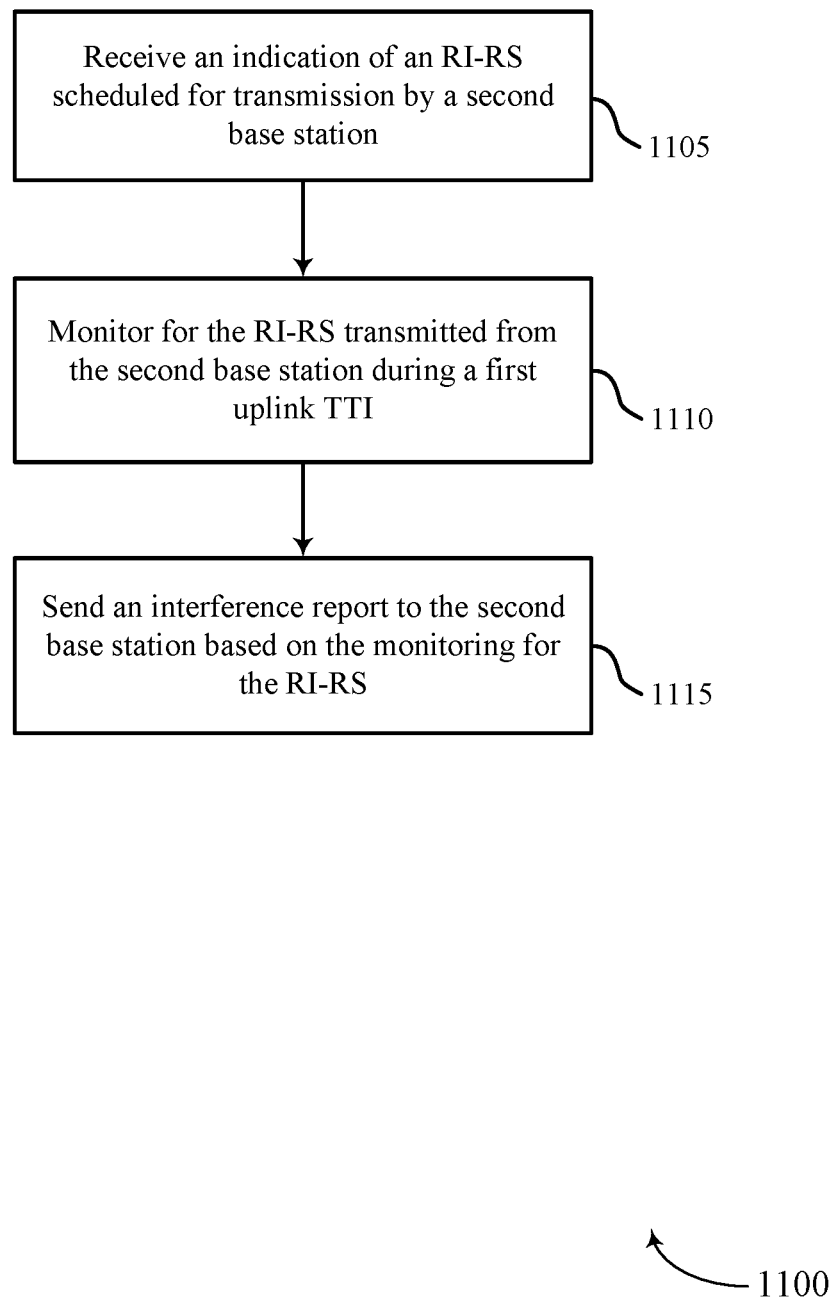
FIGS. 11 through 16 show flowcharts illustrating methods that support management of remote interference in time division duplexing networks in accordance with aspects of the present disclosure.

FIG. 11 shows a flowchart illustrating a method 1100 that supports management of remote interference in time division duplexing networks in accordance with aspects of the present disclosure. The operations of method 1100 may be implemented by a base station 105 or its components as described herein. For example, the operations of method 1100 may be performed by a communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1105, the base station may receive an indication of an RI-RS scheduled for transmission by a second base station. For example, the base station may receive, at a first base station operating according to a first TDD configuration, an indication of an RI-RS to be transmitted via a second cell deployed by a second base station, the second cell operating according to a second TDD configuration that is synchronized in time with the first TDD configuration. The operations of 1105 may be performed according to the methods described herein. For example, the signal transmitted by the second base station to the first base station may enhance the detection of interference between the first and second base stations. The RI-RS may in some cases be based on another signal, such as a CSI-RS, a CRS, or a TRS, or other signal. In some examples, aspects of the operations of 1105 may be performed by an RI-RS indication component as described with reference to FIGS. 7 through 10.

At 1110, the base station may monitor for the RI-RS transmitted from the second base station during a first uplink TTI. For example, the base station may monitor for the RI-RS from the second base station during at least a portion of a first uplink TTI of the first TDD configuration. The operations of 1110 may be performed according to the methods described herein. For example, the base station may identify the second base station based on monitoring for the signal, and may measure the interference caused by the second base station. In some examples, aspects of the operations of 1110 may be performed by an RI-RS detector as described with reference to FIGS. 7 through 10.

At 1115, the base station may send an interference report to the second base station based on the monitoring for the RI-RS. For example, the base station may send an interference report to the second base station, the remote interference report being based on the monitoring for the RI-RS. The operations of 1115 may be performed according to the methods described herein. For example, the interference report may be further based on the first base station measuring interference caused by the second base station. In some examples, aspects of the operations of 1115 may be performed by an interference report component as described with reference to FIGS. 7 through 10.

Figure 12:
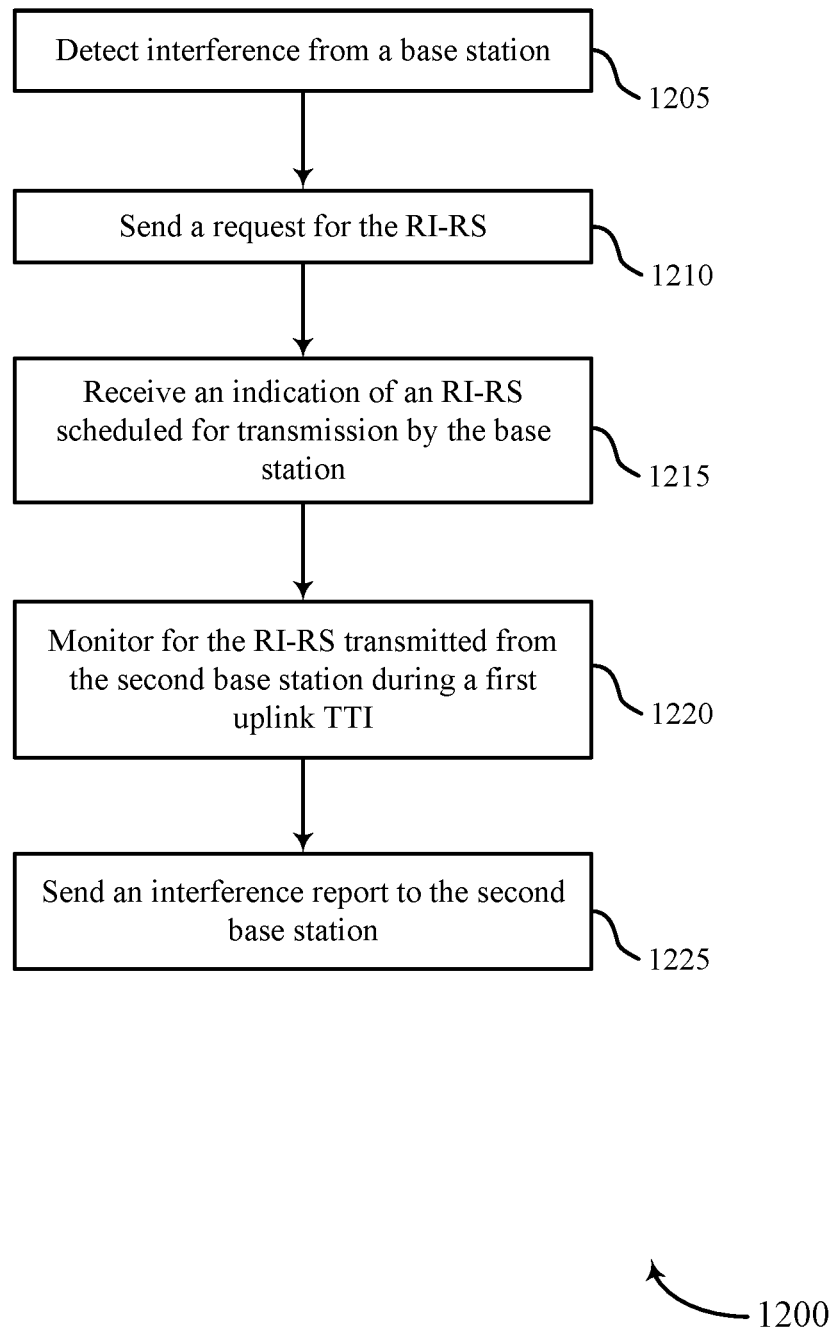

FIG. 12 shows a flowchart illustrating a method 1200 that supports management of remote interference in time division duplexing networks in accordance with aspects of the present disclosure. The operations of method 1200 may be implemented by a base station 105 or its components as described herein. For example, the operations of method 1200 may be performed by a communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1205, the base station may detect interference from a base station. For example, the base station may detect, by the first base station, interference from the second base station. Interference from the second cell or base station may in some cases be caused by strong propagation conditions in directions of other base stations, such as the first base station. For example, the second base station's downlink transmissions may interfere with the first base station due to a synchronized TDD configuration. In this example, the downlink transmissions from the second base station may interfere with uplink transmissions corresponding to the first base station. The operations of 1205 may be performed according to the methods described herein. In some examples, aspects of the operations of 1205 may be performed by an interference detection component as described with reference to FIGS. 7 through 10.

At 1210, the base station may send a request for the RI-RS. For example, the base station may send, to the second base station, a request for transmission of the RI-RS. The operations of 1210 may be performed according to the methods described herein. The request for RI-RS may be transmitted by the first base station to the second base station, and the RI-RS may enhance detection of interference between the first base station and the second base station. In some examples, aspects of the operations of 1210 may be performed by an RI-RS request component as described with reference to FIGS. 7 through 10.

At 1215, the base station may receive an indication of an RI-RS scheduled for transmission by the base station. For example, the base station may receive, at a first base station operating according to a first TDD configuration, an indication of an RI-RS to be transmitted via a second cell deployed by a second base station, the second cell operating according to a second TDD configuration that is synchronized in time with the first TDD configuration. The operations of 1215 may be performed according to the methods described herein. For example, the signal transmitted by the second base station to the first base station may enhance the detection of interference between the first and second base stations. The RI-RS may in some cases be based on another signal, such as a CSI-RS, a CRS, or a TRS, or other signal. In some examples, aspects of the operations of 1215 may be performed by an RI-RS indication component as described with reference to FIGS. 7 through 10.

At 1220, the base station may monitor for the RI-RS transmitted from the second base station during a first uplink TTI. For example, the base station may monitor for the RI-RS from the second base station during at least a portion of a first uplink TTI of the first TDD configuration. The operations of 1220 may be performed according to the methods described herein. For example, the base station may identify the second base station based on monitoring for the signal, and may measure the interference caused by the second base station. In some examples, aspects of the operations of 1220 may be performed by an RI-RS detector as described with reference to FIGS. 7 through 10.

At 1225, the base station may send an interference report to the second base station. For example, the base station may send an interference report to the second base station, the remote interference report being based on the monitoring for the RI-RS. The operations of 1225 may be performed according to the methods described herein. For example, the interference report may be further based on the first base station measuring interference caused by the second base station. In some examples, aspects of the operations of 1225 may be performed by an interference report component as described with reference to FIGS. 7 through 10.

Figure 13:
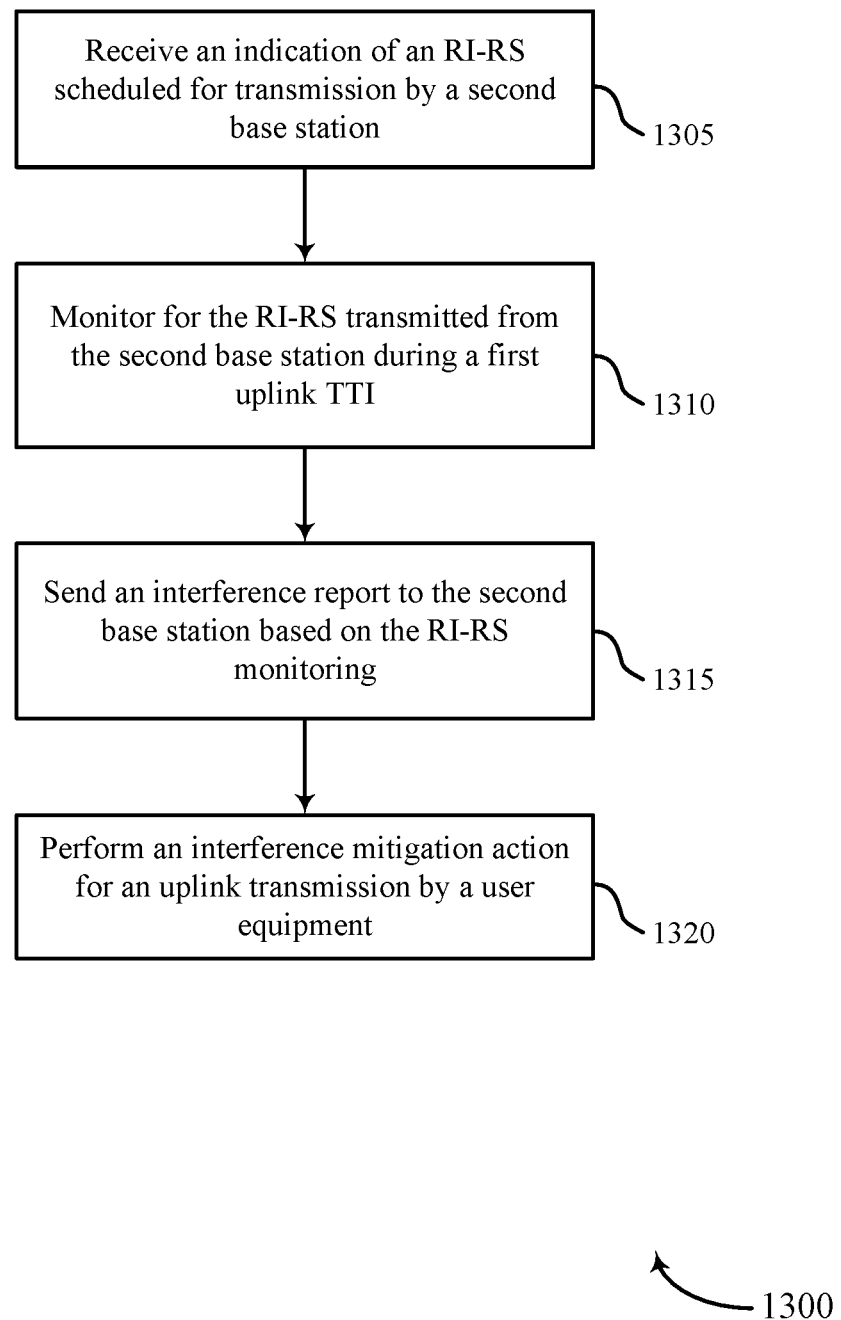

FIG. 13 shows a flowchart illustrating a method 1300 that supports management of remote interference in time division duplexing networks in accordance with aspects of the present disclosure. The operations of method 1300 may be implemented by a base station 105 or its components as described herein. For example, the operations of method 1300 may be performed by a communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1305, the base station may receive an indication of an RI-RS scheduled for transmission by a second base station. For example, the base station may receive, at a first base station operating according to a first TDD configuration, an indication of an RI-RS to be transmitted via a second cell deployed by a second base station, the second cell operating according to a second TDD configuration that is synchronized in time with the first TDD configuration. The operations of 1305 may be performed according to the methods described herein. For example, the signal transmitted by the second base station to the first base station may enhance the detection of interference between the first and second base stations. The RI-RS may in some cases be based on another signal, such as a CSI-RS, a CRS, or a TRS, or other signal. In some examples, aspects of the operations of 1305 may be performed by an RI-RS indication component as described with reference to FIGS. 7 through 10.

At 1310, the base station may monitor for the RI-RS transmitted from the second base station during a first uplink TTI. For example, the base station may monitor for the RI-RS from the second base station during at least a portion of a first uplink TTI of the first TDD configuration. The operations of 1310 may be performed according to the methods described herein. For example, the base station may identify the second base station based on monitoring for the signal, and may measure the interference caused by the second base station. In some examples, aspects of the operations of 1310 may be performed by an RI-RS detector as described with reference to FIGS. 7 through 10.

At 1315, the base station may send an interference report to the second base station based on the RI-RS monitoring. For example, the base station may send an interference report to the second base station, the remote interference report being based on the monitoring for the RI-RS. The operations of 1315 may be performed according to the methods described herein. For example, the interference report may be further based on the first base station measuring interference caused by the second base station. In some examples, aspects of the operations of 1315 may be performed by an interference report component as described with reference to FIGS. 7 through 10.

At 1320, the base station may perform an interference mitigation action for an uplink transmission by a user equipment. For example, the base station may perform, based on the monitoring for the RI-RS, an interference mitigation action for an uplink transmission by a user equipment served by the first cell in a second uplink TTI to mitigate interference from a transmission from the second base station over the second cell in a second cell. The operations of 1320 may be performed according to the methods described herein. In some cases, the interference may be mitigated by modifying uplink scheduling at the first base station. For example, the UE transmitting the interfered uplink transmission to the victim base station may apply different power levels for different symbols in the interfered uplink transmission. In some examples, aspects of the operations of 1320 may be performed by an interference mitigation component as described with reference to FIGS. 7 through 10.

Figure 14:
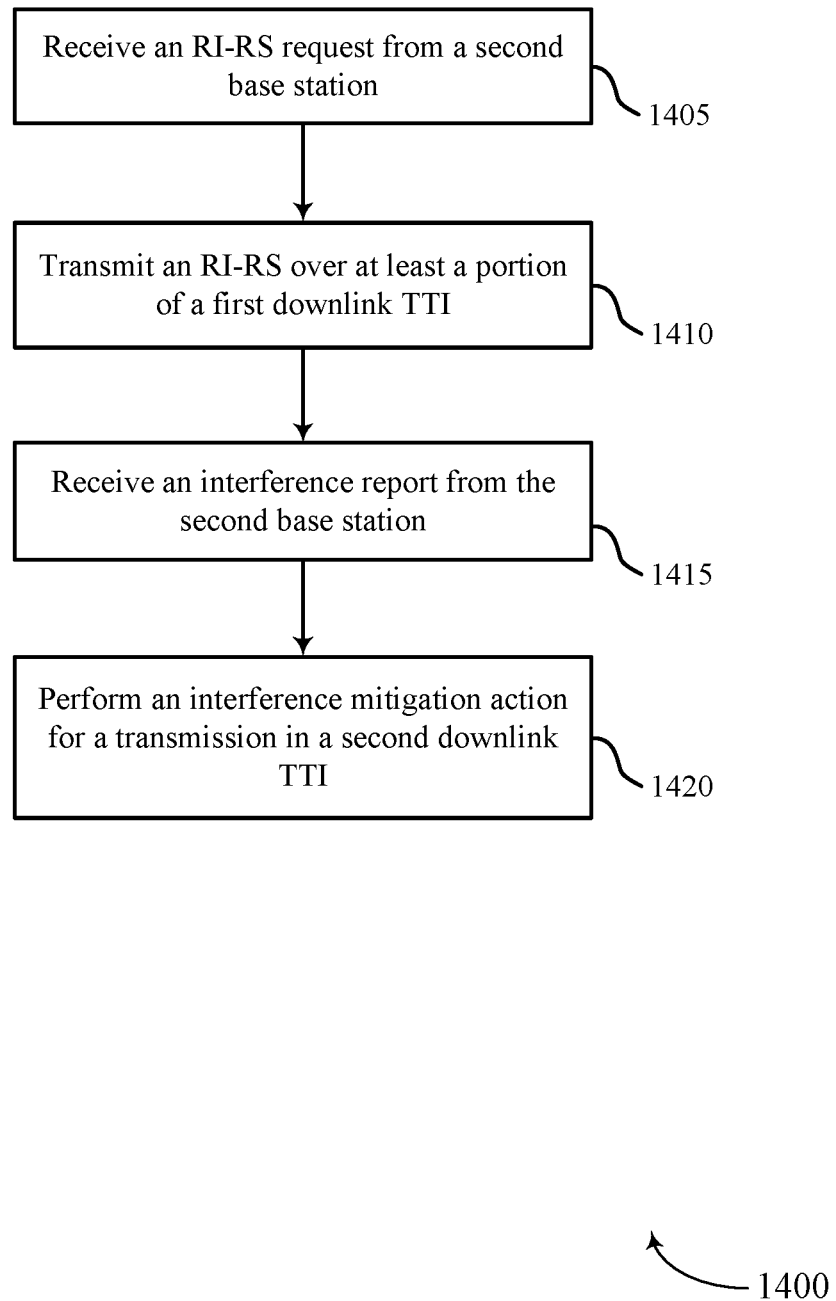

FIG. 14 shows a flowchart illustrating a method 1400 that supports management of remote interference in time division duplexing networks in accordance with aspects of the present disclosure. The operations of method 1400 may be implemented by a base station 105 or its components as described herein. For example, the operations of method 1400 may be performed by a communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1405, the base station may receive an RI-RS request from a second base station. For example, the base station may receive, at a first base station, an RI-RS request from a second base station, the first base station configured with a first TDD configuration and the second base station configured with a second TDD configuration that is synchronized in time with the first TDD configuration. The operations of 1405 may be performed according to the methods described herein. For example, the signal transmitted by the second base station to the first base station may enhance the detection of interference between the first and second base stations. The RI-RS may in some cases be based on another signal, such as a CSI-RS, a CRS, or a TRS, or other signal. In some examples, aspects of the operations of 1405 may be performed by an RI-RS request component as described with reference to FIGS. 7 through 10.

At 1410, the base station for transmit an RI-RS over at least a portion of a first downlink TTI. For example, the base station may transmit an RI-RS over at least a portion of a first downlink TTI. The operations of 1410 may be performed according to the methods described herein. In some cases, the base station may transmit the RI-RS in response to detecting remote interference from the second base station. In some examples, aspects of the operations of 1410 may be performed by an RI-RS transmitting component as described with reference to FIGS. 7 through 10.

At 1415, the base station may receive an interference report from the second base station. For example, the base station may receive an interference report from the second base station, the interference report being based on the transmitted RI-RS. The operations of 1415 may be performed according to the methods described herein. For example, the interference report may be further based on the first base station measuring interference caused by the second base station. In some examples, aspects of the operations of 1415 may be performed by an interference report component as described with reference to FIGS. 7 through 10.

At 1420, the base station may perform an interference mitigation action for a transmission in a second downlink TTI. For example, the base station may perform an interference mitigation action for a transmission in a second downlink TTI based on the interference report. The operations of 1420 may be performed according to the methods described herein. In some cases, the interference may be mitigated by modifying transmission at the second base station. For example, the second base station may skip or reduce transmission of CRS or CSI-RS in a subframe or slot prior to the guard period. In some examples, aspects of the operations of 1420 may be performed by an interference mitigation component as described with reference to FIGS. 7 through 10.

Figure 15:
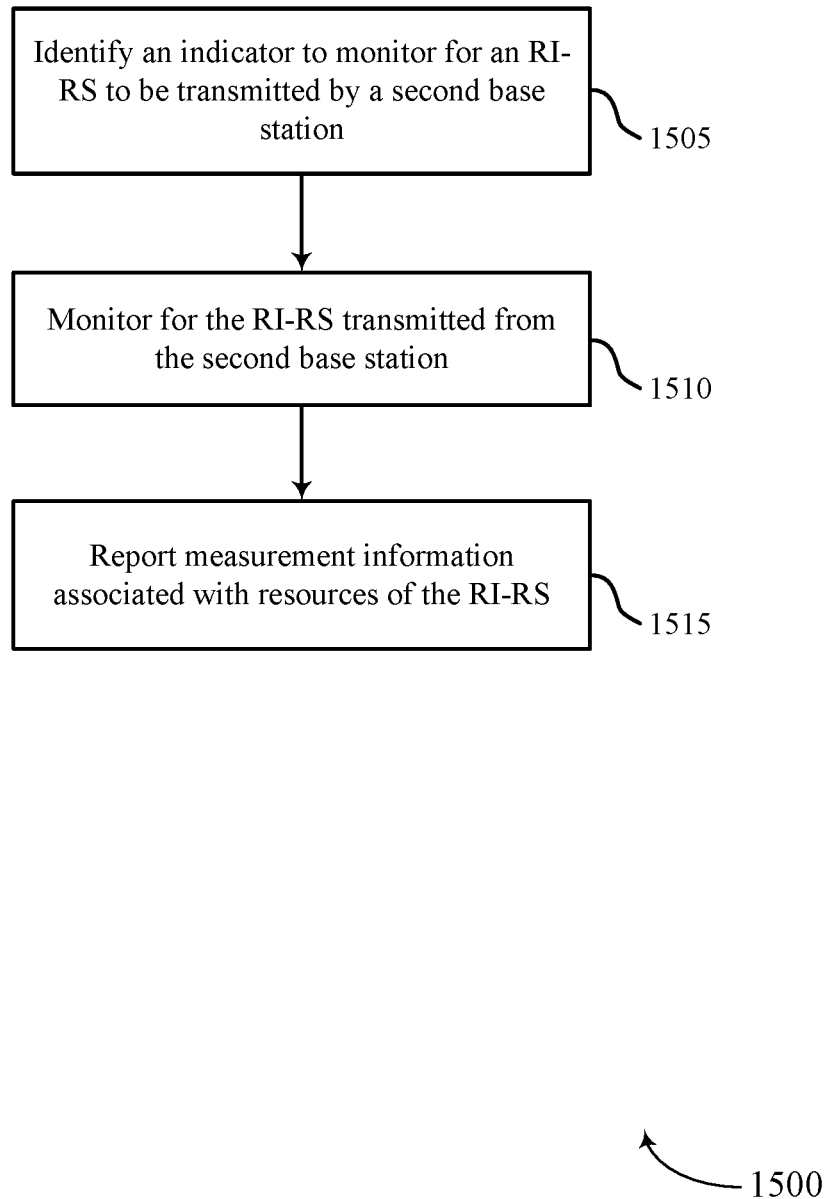

FIG. 15 shows a flowchart illustrating a method 1500 that management of remote interference in time division duplexing networks in accordance with aspects of the present disclosure. The operations of method 1500 may be implemented by a base station 105 or its components as described herein. For example, the operations of method 1500 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1505, the first base station may identify an indicator to monitor for an RI-RS to be transmitted by a second base station. For example, the first base station, deploying a first cell operating according to a first TDD configuration, may identify an indicator to monitor for an RI-RS scheduled for transmission by a second base station, the second base station operating according to a second TDD configuration that is synchronized in time with the first TDD configuration. The operations of 1505 may be performed according to the methods described herein. For example, the first base station may be an example of an aggressor base station, and the second base station may be an example of a victim base station. When the second base station detects interference on the second cell from the first cell, the second base station may transmit the indicator to the first base station so that the first base station, the second base station, or both, may implement a remote interference mitigation technique. The RI-RS may in some cases be based on another signal, such as a CSI-RS, a CRS, or a TRS, or other signal. In some examples, aspects of the operations of 1505 may be performed by an RI-RS indication component as described with reference to FIGS. 7 through 10.

At 1510, the first base station may monitor for the RI-RS transmitted from the second base station. For example, the first base station may monitor for the RI-RS from the second base station during at least a portion of a first uplink TTI of the first TDD configuration. The operations of 1510 may be performed according to the methods described herein. For example, the first base station may measure the interference caused by the first cell to the second cell provided by the second base station based on the RI-RS transmitted from the second base station. In some examples, aspects of the operations of 1510 may be performed by an RI-RS detector as described with reference to FIGS. 7 through 10.

At 1515, the first base station may report measurement information associated with resources of the RI-RS. For example, the first base station may report measurement information associated with resources of the RI-RS based on the monitoring for the RI-RS. The operations of 1515 may be performed according to the methods described herein. For example, the measurement information may include at least one of a location of the first base station, an observed delay at the first base station associated with the second base station, detected power information for one or more time-frequency resources, detected signal strength for the RI-RS, or a detected transmission parameter for the RI-RS. The first base station may, in some cases, report the measurement information to the second base station or to a network device. In some cases, the first base station, the second base station, or the network device may implement or modify an interference mitigation technique based on the reported measurement information. In some examples, aspects of the operations of 1515 may be performed by an interference report component as described with reference to FIGS. 7 through 10.

Figure 16:
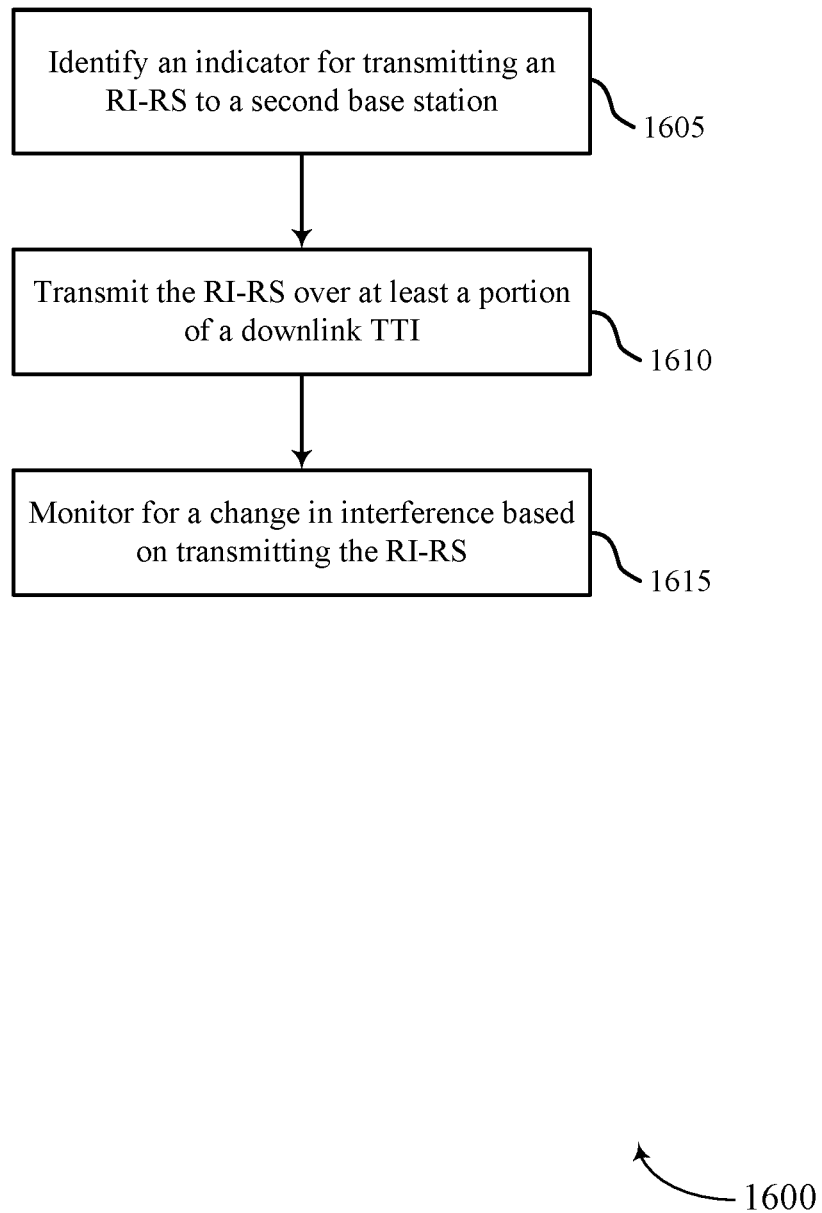

FIG. 16 shows a flowchart illustrating a method 1600 that supports management of remote interference in time division duplexing networks in accordance with aspects of the present disclosure. The operations of method 1600 may be implemented by a base station 105 or its components as described herein. For example, the operations of method 1600 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1605, the base station may identify an indicator for transmitting an RI-RS to a second base station. For example, the base station may identify an indicator for transmitting an RI-RS to a second base station, the first base station configured with a first TDD configuration and the second base station configured with a second TDD configuration that is synchronized in time with the first TDD configuration. The operations of 1605 may be performed according to the methods described herein. The indicator may, in some cases, be a trigger for transmitting the RI-RS. For example, the first base station (e.g., a victim base station) may detect interference from the second base station (e.g., an aggressor base station), which may be an indicator or trigger for the first base station to transmit the RI-RS to the second base station. In some other examples, the indicator for transmitting the RI-RS to the second base station may be received in a transmission from the second base station. In some examples, aspects of the operations of 1605 may be performed by an RI-RS request component as described with reference to FIGS. 7 through 10.

At 1610, the base station may transmit the RI-RS over at least a portion of a downlink TTI. For example, the base station may transmit the RI-RS based on the indicator, during at least a portion of a downlink TTI. The operations of 1610 may be performed according to the methods described herein. In some cases, the base station may transmit the RI-RS to the second base station. The RI-RS may in some cases be based on another signal, such as a CSI-RS, a CRS, or a TRS, or other signal. In some examples, aspects of the operations of 1610 may be performed by an RI-RS transmitting component as described with reference to FIGS. 7 through 10.

At 1615, the base station may monitor for a change in interference based on transmitting the RI-RS. For example, the base station may monitor for a variation in interference for the first base station based on transmitting the RI-RS. For example, the RI-RS may be received by an aggressor base station and the aggressor base station may mitigate the interference based on receiving the RI-RS. Where the interference has been mitigated, the base station may, for example, stop transmitting the RI-RS. The operations of 1615 may be performed according to the methods described herein. In some examples, aspects of the operations of 1615 may be performed by an interference mitigation component as described with reference to FIGS. 7 through 10. It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, at a first base station operating according to a first time division duplexing (TDD) configuration, an indicator to monitor for a remote interference reference signal (RI-RS) scheduled for transmission by a second base station, the second base station operating according to a second TDD configuration that is synchronized in time with the first TDD configuration;
   monitoring for the RI-RS from the second base station during at least a portion of a first uplink transmission time interval (TTI) of the first TDD configuration; and
   reporting measurement information associated with resources of the RI-RS based at least in part on the monitoring for the RI-RS.

2. The method of claim 1, further comprising:
   receiving an indication of the RI-RS, the indication comprising at least one of: a periodicity of the RI-RS, resources associated with the RI-RS, or a sequence for the RI-RS.

3. The method of claim 1, further comprising:
   performing an interference mitigation action comprising at least one of: modifying a reference signal configuration for the first base station, modifying a transmission power for at least one time-frequency resource of a downlink TTI, modifying a number of symbols of a downlink physical shared channel transmission in the downlink TTI, suppressing scheduling for at least one beam for the downlink TTI, or suppressing scheduling for at least one transmission layer for the downlink TTI.

4. The method of claim 1, wherein the measurement information comprises at least one of: a location of the first base station, an observed delay at the first base station associated with the second base station, detected power information for one or more time-frequency resources, detected signal strength for the RI-RS, or a detected transmission parameter for the RI-RS.

5. The method of claim 1, wherein the first TDD configuration and the second TDD configuration have a same directional symbol pattern or the first TDD configuration and the second TDD configuration have different directional symbol patterns.

6. The method of claim 1, wherein the detecting the RI-RS comprises:
identifying a beam identifier associated with the RI-RS.

7. The method of claim 1, further comprising:
detecting, by the first base station, interference from the second base station; and
sending, to the second base station, a request for transmission of the RI-RS.

8. The method of claim 7, further comprising:
sending an overload indication to the second base station based at least in part on the interference; and
receiving, from the second base station in response to the overload indication, an indication of remote interference of the second base station to the first base station, wherein the request for the RI-RS is based at least in part on the indication of remote interference.

9. The method of claim 8, wherein the overload indication comprises an indication of interfered time-frequency resources of the first base station.

10. The method of claim 1, wherein the indicator to monitor for an RI-RS scheduled for transmission by the second base station comprises an observation of interference from a second signal transmitted by the second base station, the second signal being exclusive of the RI-RS.

11. A method for wireless communication, comprising:
identifying, at a first base station, an indicator for transmitting a remote interference reference signal (RI-RS) to a second base station, the first base station configured with a first time division duplexing (TDD) configuration and the second base station configured with a second TDD configuration that is synchronized in time with the first TDD configuration;
transmitting, based at least in part on the indicator, the RI-RS during at least a portion of a downlink TTI; and
monitoring for a variation in interference for the first base station based at least in part on transmitting the RI-RS.

12. The method of claim 11, further comprising:
sending, to the second base station, an indication of the RI-RS, the indication comprising at least one of: a periodicity of the RI-RS, resources associated with the RI-RS, or a sequence for the RI-RS.

13. The method of claim 11, further comprising:
transmitting, to at least one UE served by the first base station, a rate matching indication for the RI-RS, the rate matching indication comprising at least one of a periodicity of the RI-RS or resources associated with the RI-RS.

14. The method of claim 11, further comprising:
receiving measurement information from the second base station based at least in part on transmitting the RI-RS.

15. The method of claim 14, wherein the measurement information comprises at least one of: a location of the second base station, an observed delay at the second base station associated with the first base station, detected power information for one or more time-frequency resources, detected signal strength for the RI-RS, or a detected transmission parameter for the RI-RS.

16. The method of claim 14, further comprising:
performing an interference cancellation operation on a received uplink transmission in a second uplink TTI to suppress a transmission from the second base station, the interference cancellation operation based at least in part on the receiving the measurement information.

17. The method of claim 14, further comprising:
performing, based at least in part on the receiving the measurement information, an interference mitigation action for an uplink transmission by a user equipment served by the first base station in a second uplink TTI to mitigate interference from a transmission from the second base station.

18. The method of claim 17, wherein performing the interference mitigation action comprises modifying a power level for at least one symbol of the uplink transmission by the UE.

19. The method of claim 18, further comprising:
transmitting, to the UE, a first power control command for the at least one symbol of the uplink transmission and a second power control command for other symbols of the uplink transmission.

20. The method of claim 18, further comprising:
transmitting, to the UE, a power control delta associated with the at least one symbol of the uplink transmission.

21. The method of claim 18, wherein the performing the interference mitigation action comprises modifying a transmission duration for the uplink transmission by the UE in the second uplink TTI.

22. The method of claim 17, wherein the performing the interference mitigation action is based at least in part on a first loading level associated with the first base station and a second loading level associated with the second base station.

23. The method of claim 11, further comprising:
performing an interference mitigation action based at least in part on a first loading level and a second loading level.

24. The method of claim 11, wherein the RI-RS comprises at least one sequence repeated across a plurality of time periods.

25. The method of claim 11, wherein the transmitting the RI-RS comprises:
transmitting a first RI-RS via a first beam, the first RI-RS comprising a first beam identifier for the first beam.

26. The method of claim 25, wherein the transmitting the RI-RS comprises:
transmitting a second RI-RS via a second beam, the second RI-RS comprising a second beam identifier for the second beam, wherein;
the first and second RI-RS are multiplexed using time domain multiplexing or frequency domain multiplexing; or
the first RI-RS is transmitted using a first RI-RS sequence and the second RI-RS is transmitting using a second RI-RS sequence.

27. The method of claim 11, further comprising:
receiving an overload indication from the second base station, the overload indication comprising an indication of interfered time-frequency resources of the second base station;
determining remote interference of the first base station to the second base station for the interfered time-frequency resources; and
sending an indication of the remote interference to the second base station.

28. An apparatus for wireless communication, comprising:
   a processor,
   memory in electronic communication with the processor; and
   instructions stored in the memory and executable by the processor to cause the apparatus to:
      identify, at a first base station operating according to a first time division duplexing (TDD) configuration, an indicator to monitor for a remote interference reference signal (RI-RS) scheduled for transmission by a second base station, the second base station operating according to a second TDD configuration that is synchronized in time with the first TDD configuration;
      monitor for the RI-RS from the second base station during at least a portion of a first uplink transmission time interval (TTI) of the first TDD configuration; and report
      measurement information associated with resources of the RI-RS based at least in part on the monitoring for the RI-RS.

29. The apparatus of claim 28, wherein the instructions are further executable by the processor to cause the apparatus to:
   receive an indication of the RI-RS, the indication comprising at least one of: a periodicity of the RI-RS, resources associated with the RI-RS, or a sequence for the RI-RS.

30. The apparatus of claim 28, wherein the instructions are further executable by the processor to cause the apparatus to:
   perform an interference mitigation action comprising at least one of: modifying a reference signal configuration for the first base station, modifying a transmission power for at least one time-frequency resource of a downlink TTI, modifying a number of symbols of a downlink physical shared channel transmission in the downlink TTI, suppressing scheduling for at least one beam for the downlink TTI, or suppressing scheduling for at least one transmission layer for the downlink TTI.

31. An apparatus for wireless communication, comprising:
   a processor,
   memory in electronic communication with the processor; and
   instructions stored in the memory and executable by the processor to cause the apparatus to:
      identify, at a first base station, an indicator for transmitting a remote interference reference signal (RI-RS) to a second base station, the first base station configured with a first time division duplexing (TDD) configuration and the second base station configured with a second TDD configuration that is synchronized in time with the first TDD configuration;
      transmit, based at least in part on the indicator, the RI-RS during at least a portion of a downlink TTI; and
      monitor for a variation in interference for the first base station based at least in part on transmitting the RI-RS.

* * * * *